(12) United States Patent
Mitamura

(10) Patent No.: US 7,753,355 B2
(45) Date of Patent: Jul. 13, 2010

(54) IMAGE READER AND IMAGE FORMING APPARATUS

(75) Inventor: Akiyuki Mitamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/395,929

(22) Filed: Mar. 2, 2009

(65) Prior Publication Data
US 2009/0224466 A1    Sep. 10, 2009

(30) Foreign Application Priority Data
Mar. 7, 2008   (JP) .............................. 2008-058498

(51) Int. Cl.
B65H 5/02    (2006.01)
B65H 5/22    (2006.01)
B65H 83/00    (2006.01)
B65H 85/00    (2006.01)

(52) U.S. Cl. ........................................ 271/3.2; 271/272
(58) Field of Classification Search ................. 271/273, 271/274, 3.14, 3.18, 3.2
See application file for complete search history.

(56) References Cited

U.S. PATENT DOCUMENTS

| 4,767,114 | A | * | 8/1988 | Nishimoto | 271/3.2 |
| 6,568,674 | B2 | * | 5/2003 | Matsuda | 271/274 |
| 2006/0181015 | A1 | * | 8/2006 | Takahashi | 271/273 |
| 2007/0029725 | A1 | * | 2/2007 | Marx et al. | 271/272 |
| 2008/0042340 | A1 | * | 2/2008 | Linder et al. | 271/274 |

FOREIGN PATENT DOCUMENTS

| JP | 2001-2277 | 1/2001 |
| JP | 2003-222957 | 8/2003 |

* cited by examiner

*Primary Examiner*—David H Bollinger
(74) *Attorney, Agent, or Firm*—Fitzpatrick, Cella, Harper & Scinto

(57) ABSTRACT

An image reader has an image reading portion and first and second conveying portions each having plural pairs of rotating bodies. A first changing portion makes a changeover between a first state in which the plural pairs of rotating bodies in the first conveying portion nips the sheet and a second state in which at least one of the plural pairs of rotating bodies in the first conveying portion is separated and the other pairs of rotating bodies in the first conveying portion nip the sheet, and a second changing portion makes a changeover between a first state in which the plural pairs of rotating bodies of the second conveying portion nips the sheet and a second state in which at least one of the plural pairs of rotating bodies in the second conveying portion is separated and the other pairs of rotating bodies in the second conveying portion nip the sheet.

8 Claims, 18 Drawing Sheets

IMAGE READER AND IMAGE FORMING APPARATUS

BACKGROUND OF THE INVENTION

1. Field of the Invention

The present invention relates to an image reader and an image forming apparatus, and more particularly to an apparatus provided with plural pairs of rollers arranged at the upstream side and the downstream side of an image reading position.

2. Description of the Related Art

Conventionally, in a image reader or an image forming apparatus having an image reader, a original conveying apparatus, which is one example of a sheet conveying apparatus for conveying an original that is a sheet, is provided, and when an image of the original is read, the original is conveyed onto an original base plate glass by the original conveying apparatus. The image of the original is read by image reading unit located below the original base plate glass. There has also been known, as the conventional image reader, the one including two image reading portions each provided with image reading unit in order to enhance productivity, wherein the front and back surfaces of the original are read during one conveyance.

In the conventional original conveying apparatus provided to the image reader described above, the original placed onto a original tray is fed by a pickup roller, separated one by one at a separation portion, and then, conveyed to the image reading portion. A pair of first conveying rollers is provided at the upstream side of the image reading portion, while a pair of second conveying rollers is provided at the downstream side of the image reading portion. When the image of the original is read, the original is conveyed as nipped between the pairs of first and second conveying rollers.

If the sheet conveying speeds of the pairs of first and second conveying rollers are the same when the original passes through the image reading portion, the original is conveyed without being bent. However, the sheet conveying speeds of the pairs of first and second conveying rollers are not the same in actuality since there is a variation in precision of parts.

When the diameter of the roller of the pair of first conveying rollers is greater than the diameter of the roller of the pair of second conveying rollers, for example, the original conveying speed of the pair of first conveying rollers is larger than that of the pair of second conveying rollers during the same period, even if the pairs of first and second conveying rollers convey the original with the same revolution. In this case, the original is bent on the reading portion. When the pairs of first and second conveying rollers are further rotated, the deflection is increased, and hence, the state of the original on the reading portion is not stabilized to deteriorate the reading quality.

In view of this, in the conventional image reader, the diameter of the roller of the pair of second conveying rollers is set greater than the diameter of the roller of the pair of first conveying rollers by the amount greater than the variation in the precision of parts. Thus, the original is pulled by the pair of second conveying rollers, with the result that the original is conveyed as being stable on the reading portion without being bent.

However, even when the roller diameter of the pair of second conveying rollers is set to be greater than the diameter of the roller of the pair of first conveying rollers, the conveying force of the pairs of first and second conveying rollers changes due to the variation in the roller pressure, when the roller pressures (nipping pressures) of the pairs of first and second conveying rollers are set to be equal to each other. In this case, the original cannot stably be conveyed. Therefore, the conveying force of the pair of second conveying rollers, which pulls the original, is set to be smaller than the conveying force of the pair of first conveying rollers. This structure prevents the pairs of first and second conveying rollers from excessively pulling at each other in order to avoid the excessive conveying load and the application of the load to the original.

However, even when the situation described above is set, there arises a phenomenon in which the reading quality is severely deteriorated, depending upon the property of the conveyed original, when the trailing end of the original passes through the pair of first conveying rollers. It is supposed that the original is a thick paper having a great grammage, for example. In this case, the moment the trailing end of the original completely passes through the pair of first conveying rollers having a great conveying force, by which the conveying force of the pair of first conveying rollers is not exerted to the original, the conveying force is temporarily reduced, resulting in that the reading quality is deteriorated.

It is supposed that the original is a thin paper having a small thickness. In this case, the moment the trailing end of the original completely passes through the pair of first conveying rollers, and then, is conveyed only by the pair of second conveying rollers, the original is temporarily pulled by the pair of second conveying rollers having a great conveying speed, so that the reading quality is deteriorated.

Therefore, in order to prevent the deterioration in the quality caused by the rapid change in the conveying condition that is generated when the original completely passes through the pair of first conveying rollers, there has conventionally been proposed a measure in which the conveying force of the pair of first conveying rollers is substantially continuously lowered before the trailing end of the original completely passes through the pair of first conveying rollers. According to this measure, the rapid reduction of the conveying force can be avoided with respect to the thick paper. With respect to the thin paper, the pair of conveying rollers that mainly conveys the thin paper is gradually changed from the pair of first conveying rollers to the pair of second conveying rollers, so that the rapid speed change can be avoided.

The pair of conveying rollers includes a drive rotating body that rotates by power transmitted from driving unit and a driven rotating body that rotates as being in press contact with the drive rotating body. The pair of conveying rollers is configured such that plural drive rotating bodies and the driven rotating bodies are equally spaced or arranged at predetermined positions in the main scanning direction. The conventional pair of first conveying rollers and the pair of second conveying rollers have plural pairs of rotating bodies, e.g., five pairs of rotating bodies, including the drive rotating body and driven rotating body.

In a state (conveying state) where all of the pairs of rotating bodies constituting the pair of conveying rollers are in press contact with a certain press-contact force, the pair of conveying rollers has the conveying force capable of conveying even the thickest paper assumed by the image reader. On the other hand, in order to lower the conveying force of the pair of conveying rollers, the press-contact force of all of the plural pairs of rotating bodies is reduced more than the press-contact force in the conveying state (separating state). There has been proposed an apparatus in which the press-contact force of all pairs of rotating bodies is set to be zero in the separating state, i.e., all the pairs of rotating bodies are completely separated.

On the other hand, the reading quality is also deteriorated when the leading end of the original reaches the press-contact portion between the drive rotating body and the driven rotating body of the pair of second conveying rollers, in the case where the original is a thick paper. This is considered to be caused as described later. Specifically, when the leading end of the original enters the press-contact portion between the drive rotating body and the driven rotating body, the original does not smoothly enter since the thickness of the paper is great. Therefore, the conveying resistance is produced instantaneously, whereby the conveying speed of the original is reduced. As a countermeasure of this situation, the pair of second conveying rollers is completely separated at the timing when the leading end of the original reaches the pair of second conveying rollers.

In order to prevent the deterioration in the reading quality, the pairs of first and second conveying rollers are appropriately changed between the conveying state and the separating state (see Japanese Patent Application Laid-Open Nos. 2001-2277 and 2003-222957).

When the image of the original is read, for example, the pair of first conveying rollers is firstly brought into the conveying state, and the pair of second conveying rollers is brought into the separating state. Thus, the original is conveyed as nipped between the pair of first conveying rollers, and the leading end of the original reaches the image reading portion with this state. The reading operation is started at the timing when the leading end of the original reaches the image reading portion. The original is further conveyed, and then, the leading end of the original reaches the pair of second conveying rollers that is in the separating state. By virtue of this structure, the deterioration in the reading quality can be prevented.

When the leading end of the original reaches the pair of second conveying rollers, the pair of second conveying rollers is changed from the separating state to the conveying state. After that, when the trailing end of the original approaches to some degree to the pair of first conveying rollers, the pair of first conveying rollers starts to change from the conveying state to the separating state, and the pair of first conveying rollers is brought into the separating state immediately before the trailing end of the original completely passes through the pair of first conveying rollers. When the trailing end of the original completely passes through the image reading portion, the reading operation is completed.

There may be the case in which a second image reading portion, which reads the surface reverse to the surface read by the reading operation, is provided at the downstream side of the pair of second conveying rollers, wherein the above-mentioned reading operation and the reading operation by the second reading portion are done during one conveyance of the original. In this case, the pair of second conveying rollers is brought into the separating state immediately before the trailing end of the original reaches the pair of second conveying rollers.

In the conventional sheet conveying apparatus, the deterioration in the reading quality can be prevented by changing the states of the pairs of first and second conveying rollers to the conveying state or to the separating state depending upon the type of the original. In order to achieve this operation, detecting unit, which determines the type of the original as needed, is required.

However, providing the detecting unit is difficult from the viewpoint of cost. Even if the detecting unit is provided, it is difficult to determine a thickness or size of the original one by one conveyed before the start of the reading operation as well as keep high productivity, since the original processing speed in the image reading is increased in recent years. Therefore, in the conventional sheet conveying apparatus, the changeover of the state of the pairs of first and second conveying rollers is performed in the same manner for all of various types of originals assumed by the image reader in its specification.

Further, it is difficult to prevent the instantaneous rapid change in the conveying state when the trailing end of the original completely passes through the pair of first conveying rollers, even if the press-contact force of the pairs of rotating bodies, which are provided at five positions, is lowered. This is because, even if the press-contact force is lowered, all of five pairs of rotating bodies are in press contact. Specifically, since all of five pairs of rotating bodies are in press contact, the portion where the original and the pairs of rotating bodies are brought into contact with each other is great. Therefore, greater friction force is generated between the pairs of rotating bodies and the original at the contact portion. As described above, when all of the pairs of rotating bodies are in press contact, the nipping force for nipping the original remains even if the press-contact force is lowered.

Specifically, even if the press-contact force of the pair of first conveying rollers is lowered, the original is substantially nipped between the pair of first conveying rollers due to the friction force between the pair of first conveying rollers and the original. Therefore, the rapid change in the conveying state at the time when the trailing end of the original completely passes through the pair of first conveying rollers cannot be prevented. This tendency is increased particularly when a thick original having a small size (A5, STMT, B6) and having a great grammage is conveyed.

The operation of the pair of first conveying rollers at the upstream side of the position where the image is read has been described above. For the pairs of rotating bodies at the downstream side from the position where the image is read, when the press-contact force for all the pairs of rotating bodies is lowered, the same problem arises as in the pair of first conveying rollers.

When the press-contact force of the pairs of rotating bodies arranged at five positions is set to be zero, the rapid change of the conveying state at the time when the trailing end of the original completely passes through the pair of first conveying rollers is prevented, but there arises a problem that the original is likely to be skew-fed the moment the press-contact force is set to be zero. This is because unit for preventing the vibration at the trailing end of the original is eliminated. Accordingly, a method for preventing the instantaneous rapid change in the conveying state at the time when the trailing end of the original completely passes through the pair of first conveying rollers is needed upon conveying a thick original having a small size.

Upon conveying a small-sized original, there my be the case in which the timing when the leading end of the original reaches the pair of second conveying rollers and the timing when the trailing end of the original reaches the pair of first conveying rollers are overlapped, so that both the pair of first conveying rollers and the pair of second conveying rollers are brought into the separating state. When both the pair of first conveying rollers and the pair of second conveying rollers are brought into the separating state, the original cannot be conveyed. When the conveying force of the pair of first conveying rollers and the conveying force of the pair of second conveying rollers are both lowered, slippage occurs between the conveying rotating body and the original in the case of a thick paper, resulting in that paper jam might be generated.

Upon conveying a small-sized thin original, when the nipping force of the pair of first conveying rollers and the nipping force of the pair of second conveying rollers are both lowered, harmful effects are likely to be brought about. Specifically, since the thin original is susceptible to the effect caused by the conveyance, compared to the thick original, even if the press-contact force of the conveying rotating body is small, the original is liable to be skew-fed or wrinkles are liable to be generated in the conveying direction. Therefore, the reading quality might be significantly deteriorated, or the original itself might be damaged.

In view of the circumstance described above, the present invention provides an image reader and an image forming apparatus that can stably convey an original (sheet) and can prevent the deterioration of the reading quality.

SUMMARY OF THE INVENTION

An image reader according to the present invention includes an image reading portion that reads an image of a sheet conveyed at an image reading position; a first conveying portion that includes plural pairs of first rotating bodies arranged in the widthwise direction of the sheet, which crosses the sheet conveying direction, that is provided at the upstream of the image reading position in the sheet conveying direction, and that conveys the sheet to the image reading position; a second conveying portion that includes plural pairs of second rotating bodies arranged in the widthwise direction of the sheet, which crosses the sheet conveying direction, that is provided at the downstream of the image reading position in the sheet conveying direction, and that conveys the sheet to the image reading position; a first changing portion that makes a changeover between a first state in which the plural pairs of first rotating bodies nip the sheet and a second state in which at least one of the plural pairs of first rotating bodies is separated and the nipping force of the other pairs of first rotating bodies is reduced compared to the first state; and a second changing portion that makes a changeover between a first state in which the plural pairs of second rotating bodies nip the sheet and a second state in which at least one of the plural pairs of second rotating bodies is separated and the nipping force of the other pairs of second rotating bodies is reduced compared to the first state.

According to the present invention, when the state is changed to a second state in which at least one pair of first rotating bodies of the plural pairs of rotating bodies of the first and second sheet conveying portion is separated and the other pair of first rotating bodies are in press contact, the sheet can stably be conveyed and the reading quality can be prevented from being deteriorated.

Further features of the present invention will become apparent from the following description of exemplary embodiments with reference to the attached drawing.

DESCRIPTION OF THE EMBODIMENTS

An exemplary embodiment of the present invention will be described below in detail with reference to the drawings.

Figure 1:
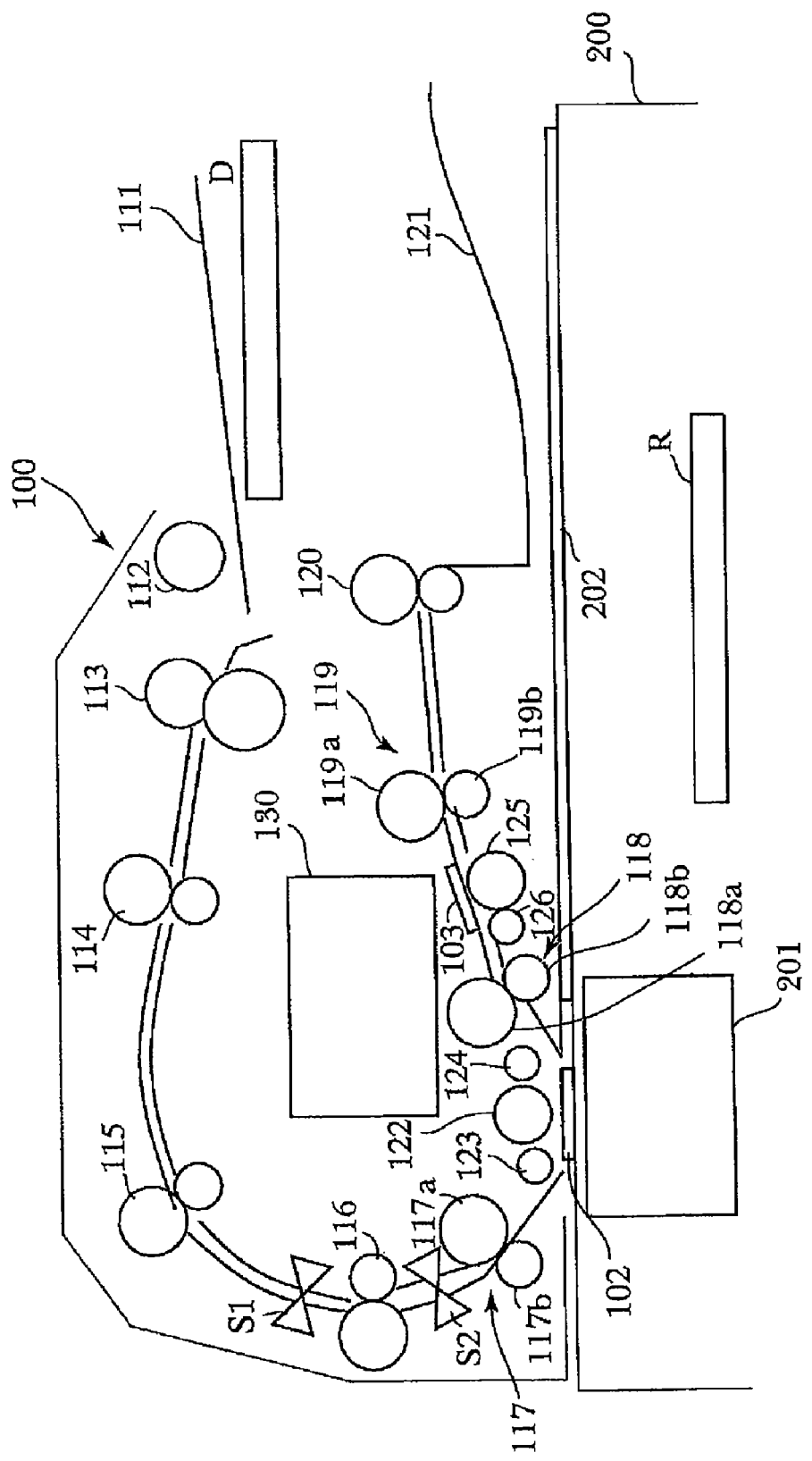
FIG. 1 is a view illustrating a structure of an image reader according to an embodiment of the present invention.

FIG. 1 is a view illustrating a structure of an image reader according to an embodiment of the present invention.

In FIG. 1, a reader 200, which is an image reader, optically reads image information recorded onto a original, which is the subject to be read, photoelectrically converts the read image information into image data, and inputs the image data to an image forming apparatus not illustrated. Transparent first and second platen glasses 202 and 102 are provided on the top surface of the reader 200. The reader 200 is provided with a first image reading portion 201 including a lamp that irradiates unillustrated light to the original, a reflection shade, and an image reduction optical system that directs the reflection light from the original to a photoelectric element R so as to reduce.

An ADF (automatic original feeding apparatus) 100, which is a sheet conveying apparatus, for conveying the original to an image reading position where the image can be read by the first image reading portion 201 is provided on the upper surface of the reader 200. The reader 200 reads the image of the original conveyed by the ADF 100 to the image reading position on the second platen glass 102 by the first image reading portion 201. The reader 200 can also read the image of the original placed onto the first platen glass 202 by scanning the first image reading portion 201 in the sub-scanning direction.

The ADF 100 is provided with a second image reading portion 130 that reads an image on the back surface of the original. The second image reading portion 130 irradiates light to the back surface of the original, which passes below a skimming glass 103, from a light source not illustrated, photoelectrically converts the reflection light from the original by a light receiving element, and outputs an electric signal according to the quantity of the incident light.

The ADF 100 conveys the original placed onto an original tray 111 to the image reading position by the first image reading portion 201 and the second image reading portion 130 upon the skimming, for example. The ADF 100 is provided above the original tray, and provided with a sheet feeding roller 112 for feeding an original.

The sheet feeding roller 112 is rotatably supported by an unillustrated arm that is rotatable in the vertical direction. The sheet feeding roller 112 is retracted to the upper position, which is a home position, by the upper rotation movement of the arm so as not to hinder the operation of setting the original. When the operation of feeding the original is started, the sheet feeding roller 112 descends by the lower rotation movement of the arm, thereby being abutted with the upper surface of the original.

A pair of separation rollers 113, which serves as a separating portion, for separating the original one by one is provided at the downstream side of the sheet feeding roller 112. Conveying rollers 114 and 115 that convey the original, which is conveyed as separated one by one by the pair of separation rollers 113, to a pair of registration rollers 116 is provided at the downstream side of the pair of separation rollers 113.

The pair of registration rollers 116 serves to align the leading end of the original. The leading end of a single original, which is separated by the pair of separation rollers 113, is abutted against a nip portion of the pair of registration rollers 116 at rest so as to produce a loop on the original, whereby the leading end of the original is aligned.

The original whose leading end is aligned by the pair of registration rollers 116 is later conveyed to the image reading position by a pair of first read rollers 117, which is first sheet conveying unit arranged at the upstream side of the image reading position. Thereafter, the original passing through the image reading position is conveyed as passing onto the second platen glass 102 by the pair of first read rollers 117 and a pair of second read rollers 118, which is second sheet conveying unit arranged at the downstream side of the image reading position. During this operation, the information of the image on the front surface of the original is read by the first image reading portion 201.

As illustrated in FIG. 1, the second platen glass 102 has a platen roller 122 and casters 123 and 124 arranged thereto with a predetermined gap from the platen glass 102 in order to stabilize original conveying property. The skimming glass 103 also has a platen roller 125 and a caster 126 arranged thereto with a predetermined gap from the skimming glass 103 for the same purpose.

A registration sensor S1 that detects the leading end of the original before the original enters the platen glass 102 (image reading position) is arranged at the upstream side of the pair of registration rollers 116. A read sensor S2 that detects the leading end and the trailing end of the conveyed original is provided at the upstream side of the pair of first read rollers 117. The detection output from the registration sensor S1 and the read sensor S2 is input to a control portion D that controls the operation of the ADF 100.

The reader 200 includes a skimming mode in which an image of a original is read at the position of the second platen glass 102 and the skimming glass 103, while conveying the original by the ADF 100, with the first image reading portion 201 being stopped.

An original-image reading operation in the skimming mode of the reader 200 will next be described.

When an image of a original is read in the skimming mode, the arm is firstly descended to allow the sheet feeding roller to abut against the top surface of the original. Thereafter, the sheet feeding roller 112 is rotated to convey the uppermost original to the pair of separation rollers 113. When plural originals are conveyed as superimposed, the pair of separation rollers 113 separates the uppermost original from the other originals, and the separated original is conveyed.

The single original separated from the other originals is conveyed to the pair of registration rollers 116 by the conveying rollers 114 and 115. After the leading end is aligned by the pair of registration rollers 116, the original is conveyed onto the second platen glass 102 by the pairs of first and second read rollers 117 and 118. During this operation, the information of the image on the front surface of the original is read by the first image reading portion 201. The reading operation is started at the time when the read sensor S2 arranged at the upstream side of the pair of first read rollers 117 detects the leading end of the original.

When the image on the front surface of the original is completely read, the original then passes below a second skimming glass 103 by the pair of second read rollers 118. During this operation, the information of the image on the back surface of the original is read by the second image reading portion 130. After the image on the back surface of the original is read by the second image reading portion 130, the original is discharged onto a sheet discharge tray 121 by the pair of conveying rollers 119 and a pair of discharge rollers 120.

The pair of first read rollers 117 includes plural drive rollers 117a, which are drive rotating bodies arranged in the widthwise direction orthogonal to the sheet conveying direction, and plural driven rollers 117b, which are driven rotating bodies that are in press contact with the drive rollers 117a so as to be in contact with the drive rollers 117a or apart from the drive rollers 117a. Specifically, the pair of first read rollers 117 includes plural rotating bodies arranged in the line extending in the widthwise direction orthogonal to the sheet conveying direction. The pair of second read rollers 118 includes plural drive rollers 118a, which are arranged in the line extending in the widthwise direction, and plural driven rollers 118b, which are in press contact with the drive rollers 118a so as to be in contact with the drive rollers 118a or apart from the drive rollers 118a. Specifically, the pair of second read rollers 118 includes plural rotating bodies arranged in the widthwise direction. The pair of conveying rollers 119 includes plural drive rollers 119a, and plural driven rollers 119b, which are in press contact with the drive rollers 119a so as to be in contact with the drive rollers 119a or apart from the drive rollers 119a.

Figure 2:
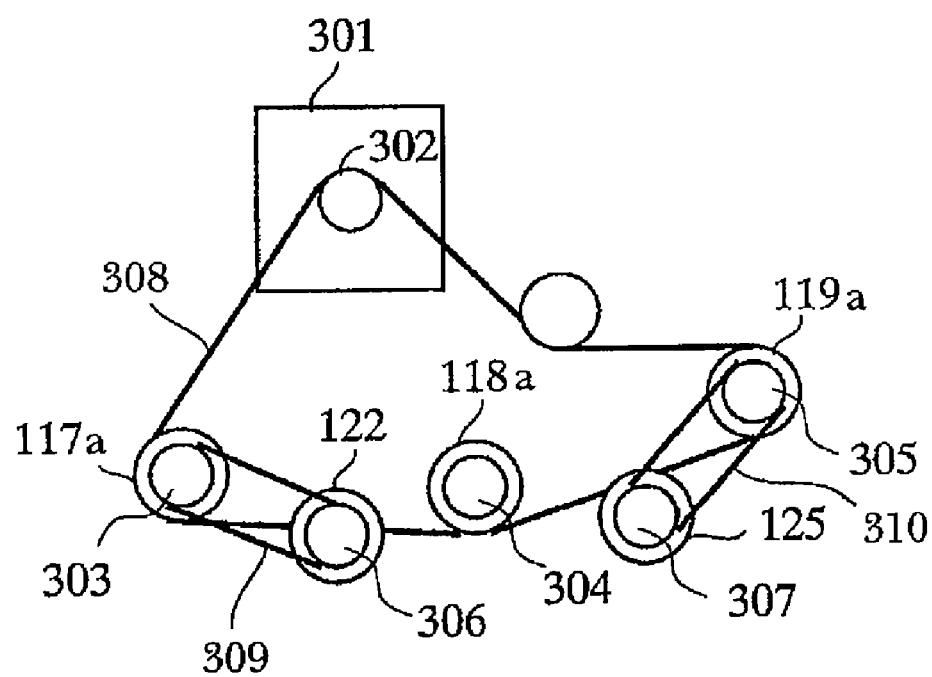
FIG. 2 is a view for describing a driving system of an ADF provided to the image reader.

The drive rollers 117a and 118a of the pairs of first and second read rollers 117 and 118, the drive rollers 119a of the pair of conveying rollers 119, and the platen rollers 122 and 125 are driven by a read motor 301 as illustrated in FIG. 2.

In FIG. 2, the a pulley 302 is fixed to a rotation axis of the read motor 301, a pulley 303 is mounted to the drive rollers 117a of the pair of first read rollers 117, and a pulley 304 is mounted to the drive rollers 118a of the pair of second read rollers 118. A pulley 305 is mounted to the drive rollers 119a of the pair of conveying rollers 119, a pulley 306 is mounted to the platen roller 122, and a pulley 307 is mounted to the platen roller 125.

The drive of the read motor 301 is transmitted to the pulleys 302 to 307 through timing belts 308 to 310 wound around the pulleys 302 to 307. Consequently, the pair of first read rollers 117 and the pair of second read rollers 118 are driven in the same manner by the read motor 301, whereby the rollers involved with the image reading are driven as being not affected by the variation in individual motor. The revolution speed of the read motor 301 is controlled by the control portion D (see FIG. 1).

In the present embodiment, the nipping pressure of the pair of first read rollers 117 and the pair of second read rollers 118, i.e., the sheet conveying force can be changed. A nipping pressure changing mechanism, which is conveying force changing unit, for changing the nipping pressure (sheet conveying force) of the pair of first read rollers 117 will next be described with reference to FIGS. 3 and 4. The nipping pressure (sheet conveying force) of the pair of second read rollers 118 can also be changed by the mechanism same as the nipping pressure changing mechanism (first changing portion) 190.

Figure 3:
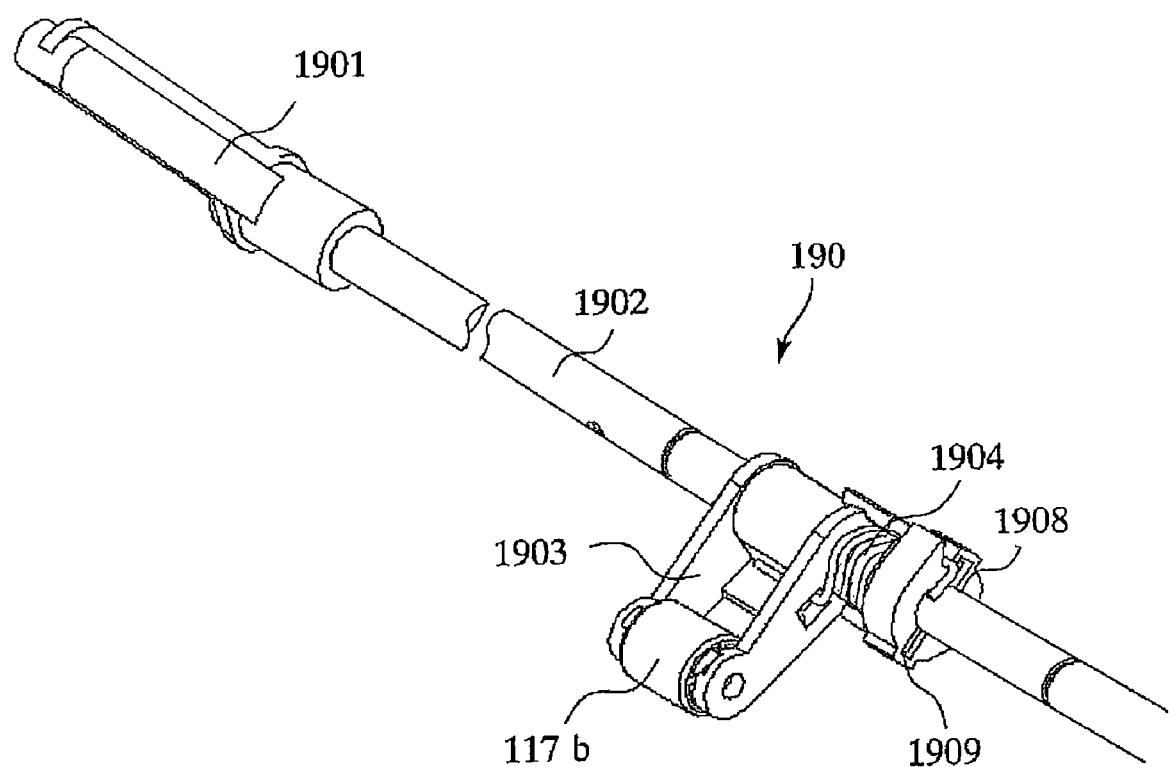
FIG. 3 is a view for describing a structure of a nipping pressure changing mechanism that changes a nipping pressure of a pair of first read rollers provided to the ADF.

In FIG. 3, an arm 1903 is a holding member that rotatably holds the driven roller 117b of the pair of first read rollers 117. The arm 1903 is mounted to a rotation shaft 1902 so as to be rotatable. A stopper 1908 is mounted to the rotation shaft 1902 in such a manner that the mounting position thereof is changeable. The stopper 1908 is locked by a pin 1909.

A torsion spring 1904 applies torsion force to the arm 1903 in the direction in which the arm 1903 applies a force to the stopper 1908. The applying force of the torsion spring 1904 allows the driven roller 117b to be in press contact with the drive roller 117a (see FIG. 1) positioned above the driven roller 117b through the arm 1903, whereby the nipping force (press-contact force) for nipping the original is applied to the pair of first read rollers 117.

A pressure lever 1901 is mounted to the end of the rotation shaft 1902 so as to be vertical with respect to the axial direction. A cam 1905 is in press contact with the pressure lever 1901 as illustrated in FIG. 4. The torsion spring 1904 illustrated in FIG. 3 applies a force to the pressure lever 1901 in the clockwise direction, i.e., toward the cam.

The position (tilt angle) of the pressure lever 1901 is changed with the rotation of the cam 1905 provided to the cam shaft 1905a. When the position of the pressure lever 1901 is changed by the cam mechanism described above, the rotation angle of the rotation shaft 1902 is changed. With this change, the force applied by the torsion spring 1904 for the driven roller 117b to apply a force to the drive roller is varied.

As described above, the applying force by the torsion spring 1904 is varied depending upon the rotational position of the cam 1905 (the position of the pressure lever 1901). Specifically, the nipping pressure of the pair of first read rollers 117 can be changed by changing the rotational position of the cam 1905.

Figure 4A:
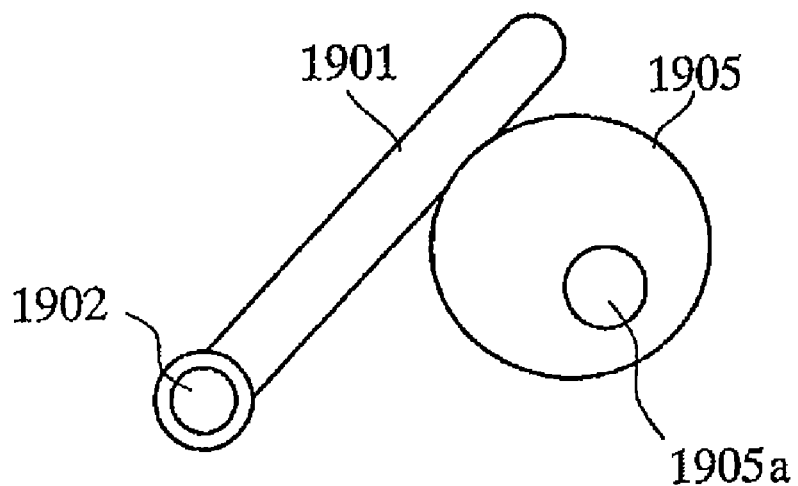
FIGS. 4A and 4B are views for describing a cam mechanism provided to the nipping pressure changing mechanism.
Figure 4B:
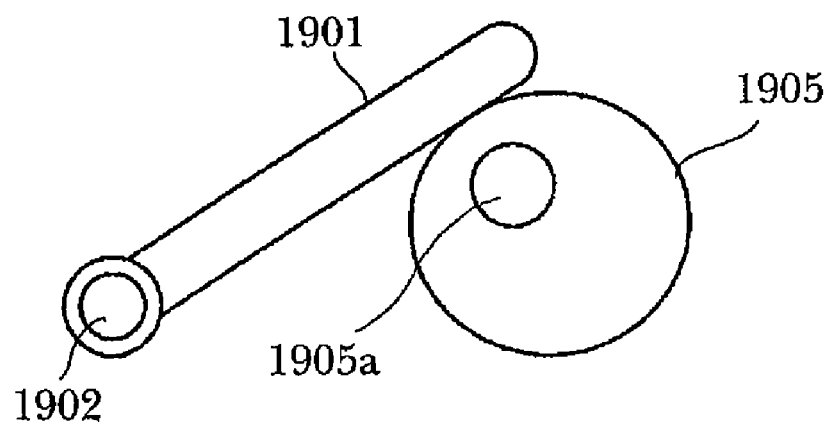

FIG. 4A illustrates the pressure state (first state) in which the driven roller 117b is pressed by the cam 1905 so as to be in press contact with the drive roller 117a. FIG. 4B illustrates a light-press-contact/separating state (second state) in which the pressing state by the cam 1905 is released, by which the driven roller 117b is separated from the drive roller 117a or the driven roller 117b is in press contact with the drive roller 117a with a light pressure.

As illustrated in FIG. 15 described later, the pair of first read rollers 117 includes plural pairs of rollers in the widthwise direction. The driven roller 117b of each of the plural pairs of rollers is held by the arm 1903 that is supported by the rotation shaft 1902 so as to be rotatable.

Figure 5:
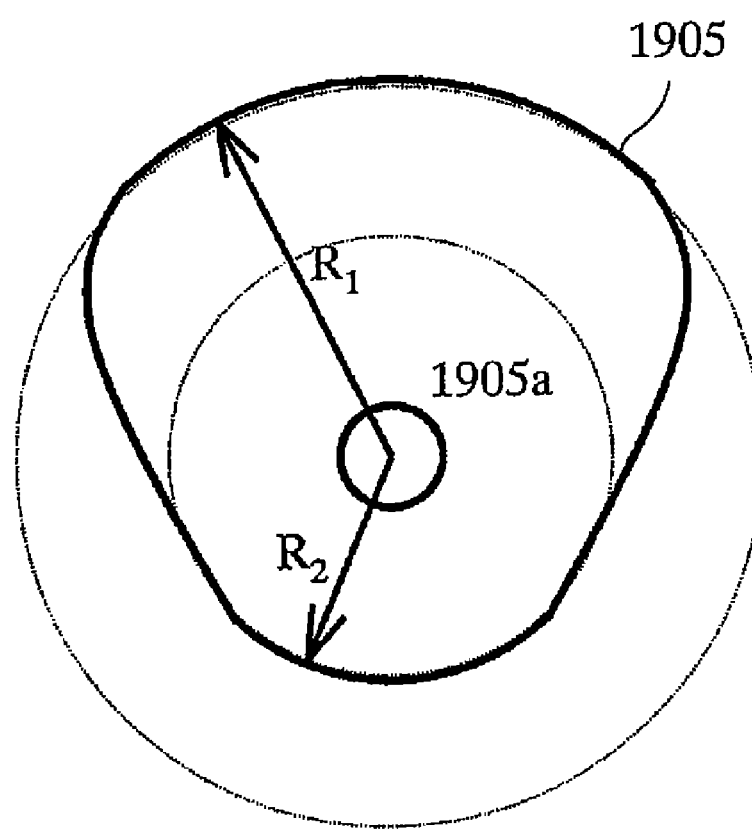
FIG. 5 is a view illustrating an outer line of the cam constituting the cam mechanism.

FIG. 5 illustrates an outer line of the cam. In the nipping pressure changing mechanism, it is when the outer line R1 in FIG. 5 and the pressure lever 1901 are in contact with each other that the nipping pressure of the pair of first read rollers 117 increases. On the other hand, it is when the outer line R2 and the pressure lever 1901 are in contact with each other that the nipping pressure is reduced or the driven roller 117b is separated from the drive roller 117a.

Figure 6A:
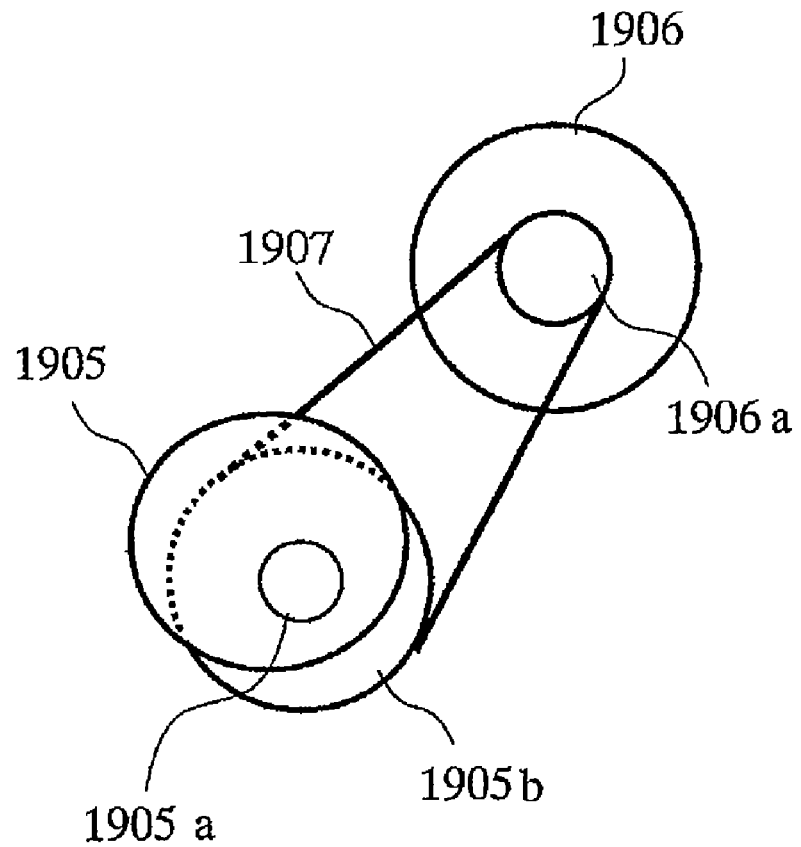
FIGS. 6A and 6B are views illustrating a drive mechanism of the cam and the structure of the cam.

FIG. 6 illustrates a driving mechanism of the cam 1905. In FIG. 6A, a pulley 1905b mounted to the cam shaft 1905a and the pulley 1905b and the cam 1905 rotate in the same manner about the cam shaft 1905a. The drive of a separation motor 1906 is transmitted to the cam 1905 through each pulley 1905b and 1906a by a belt 1907 wound around the pulleys 1906a and 1905b mounted to the separation motor 1906.

Figure 6B:
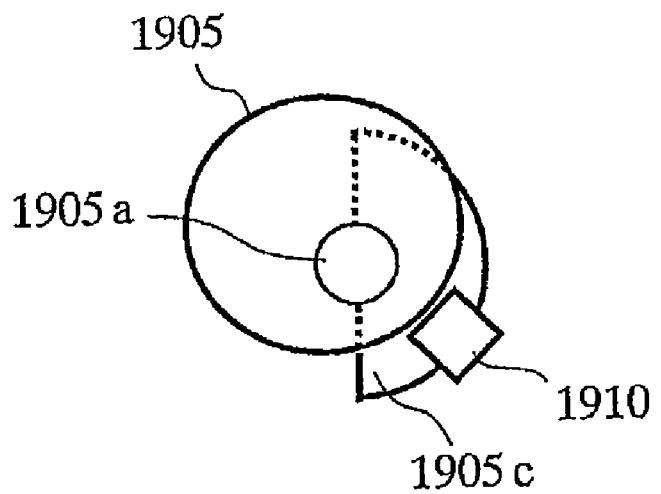

On the other hand, FIG. 6B illustrates a separation sensor 1910. A sensor flag 1905c rotates in the same manner as the cam 1905. The position of the cam 1905 can be controlled by the timing when the sensor flag 1905c passes through the separation sensor 1910. For example, the pressure position illustrated in FIG. 4A is defined as the position where the sensor flag 1905c rotates at an angle of 30° after it passes through the separation sensor 1910, i.e., the position where ten drive pulses of the separation motor 1906 are counted.

Figure 7:
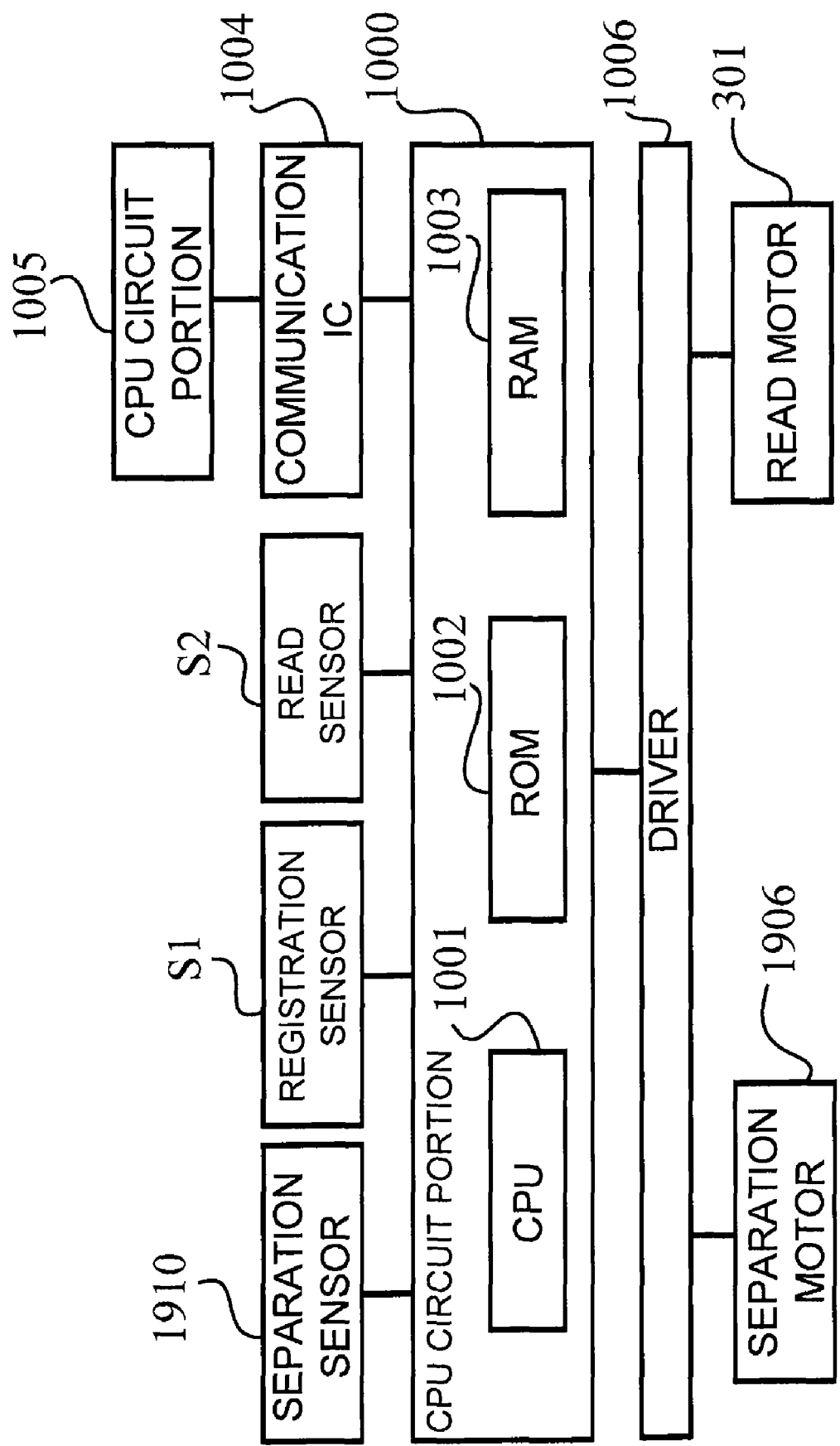
FIG. 7 is a control block diagram illustrating a control portion for controlling the drive of the ADF.

FIG. 7 is a control block diagram of the control portion D (see FIG. 1) that controls the drive of the ADF 100. The control portion D of the ADF 100 includes a CPU circuit portion 1000 having a CPU 1001, ROM 1002, RAM 1003, or the like. The CPU circuit portion 1000 makes communication with a CPU circuit portion 1005 provided to the main body of the image forming apparatus, not illustrated, through a communication IC 1004 for performing data exchange. The control portion D executes various programs stored in the ROM 1002 on the basis of the instruction from the CPU circuit portion 1005 so as to control the drive of the ADF 100.

A driver 1006 is connected to the CPU circuit portion 1000. The driver 1006 drives an unillustrated sheet feeding motor for driving the sheet feeding roller 112 and the pair of separation rollers 113 on the basis of the signal from the CPU circuit portion 1000. The driver 1006 also drives various motors such as the separation motor 1906, read motor 301, or the like, in addition to an unillustrated conveying motor for driving the conveying rollers 114 and 115 on the basis of the signal from the CPU circuit portion 1000.

The separation motor 1906 and the read motor 301 are made of a stepping motor. They can allow the pairs of rollers, which are driven through the control of an exciting pulse rate, to rotate with an equal speed or with an original speed.

The detection signals from the registration sensor S1, the read sensor S2, and the separation sensor 1910 described above are input to the CPU circuit portion 1000. The CPU circuit portion 1000 controls the drives of the separation motor 1906 and the read motor 301 on the basis of the detection signals from the sensors S1, S2, and 1910.

In the present embodiment, the light-press-contact/separating state is formed in which some of the plural drive rollers 117a and the driven rollers 117b of the pair of first read rollers 117 arranged in the main scanning direction (the widthwise direction of the original crossing the conveying direction) are completely separated, but the others are brought into press contact with each other with light nipping force (light press-contact force). Further, the light-press-contact/separating state is formed in which some of the plural drive rollers 118a and the driven rollers 118b of the pair of second read rollers 118 arranged in the main scanning direction are completely separated, but the others are brought into press contact with each other with light nipping force (light press-contact force).

In order to adjust the press-contact state as described above, the phase (mounting position) of the stopper 1908 fixed to the rotation shaft 1902 is changed so as to elastically regulate the angle of rotation of the arm 1903 that rotates integrally with the rotation shaft 1902.

Figure 8A:
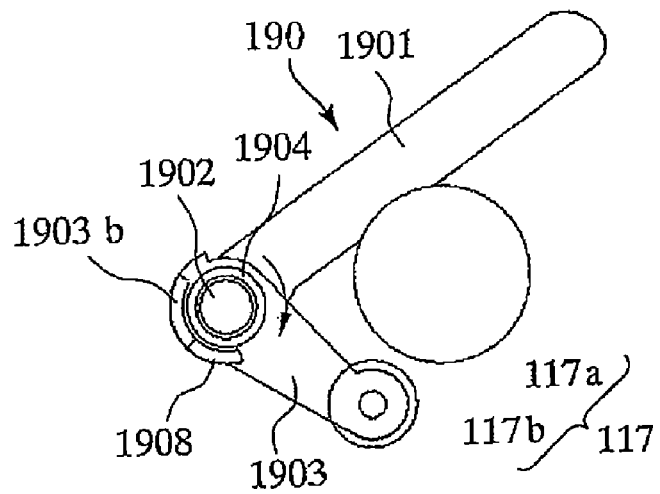
FIGS. 8A to 8C are first views for describing the operation of changing the nipping pressure of the nipping pressure changing mechanism.
Figure 8B:
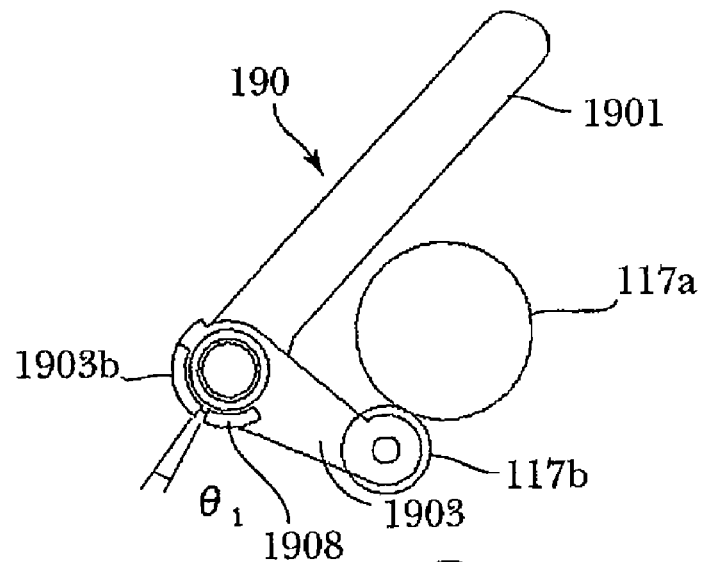
Figure 8C:
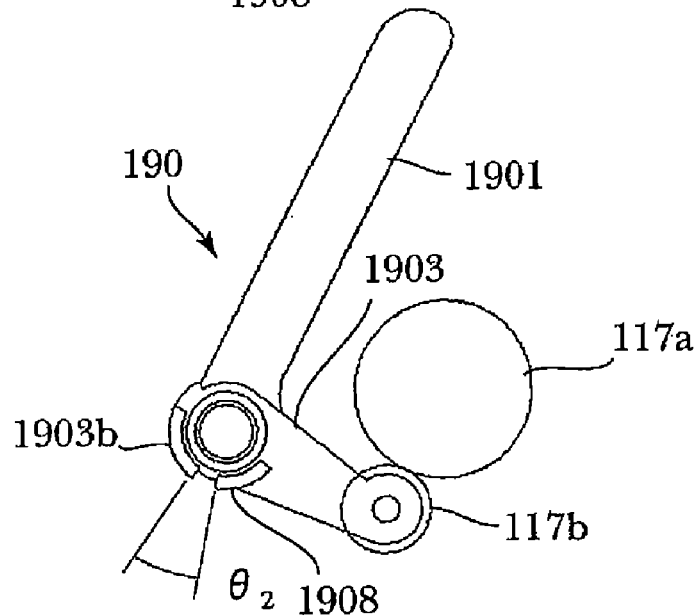

FIGS. 8B and 8C illustrate the state in which the stopper 1908 is mounted to the rotation shaft 1902 in order that the driven roller 117b is in press contact with the drive roller 117a even when the cam 1905 is in the light-press-contact/separating state illustrated in FIG. 4B. In FIG. 8, an abutment portion 1903b is mounted to the arm 1903. The state of the pressure lever 1901 is determined according to the position where the abutment portion 1903b of the arm 1903 is locked to the stopper 1908.

For example, when the stopper 1908 is mounted to the position illustrated in FIG. 8A, the pressure lever 1901 is in the horizontal state more than the light-press-contact/separating state illustrated in FIG. 4B when the abutment portion 1903b of the arm 1903 abuts the stopper 1908.

FIG. 8A illustrates the state in which the cam 1905 is not mounted in the structure illustrated in FIGS. 8B and 8C, i.e., the state in which the pressure lever 1901 is not temporarily pressed by the cam 1905 for describing the relationship between the stopper 1908 and the abutment portion 1903b. In the state in which the cam 1905 is not mounted, the position of the arm 1903 and the position of the driven roller 117b are determined through the abutment of the abutment portion 1903b of the arm 1903 and the stopper 1908. In this case, the torsion spring 1904 applies a force to the arm 1903 in the direction indicated by an arrow.

FIG. 8B illustrates that the cam 1905 is in the light-press-contact/separating state illustrated in FIG. 4B. In this case, a displacement of θ1 is further applied to the spring 1904 from the state in which the abutment portion 1903b of the arm 1903 abuts the stopper 1908 as illustrated in FIG. 8A. Thus, the drive roller 117a and the driven roller 117b are in the light-press-contact/separating state.

FIG. 8C illustrates that the cam 1905 is in the pressure state illustrated in FIG. 4A. In this case, a displacement of θ2 is further applied to the spring 1904 from the state in which the abutment portion 1903b of the arm 1903 abuts the stopper 1908 as illustrated in FIG. 8A. The inequality of θ2>θ1 is established, so that the torsion spring 1904 generates more increased torque. Accordingly, the press-contact force of the pair of first read rollers 117 is more increased.

Figure 9A:
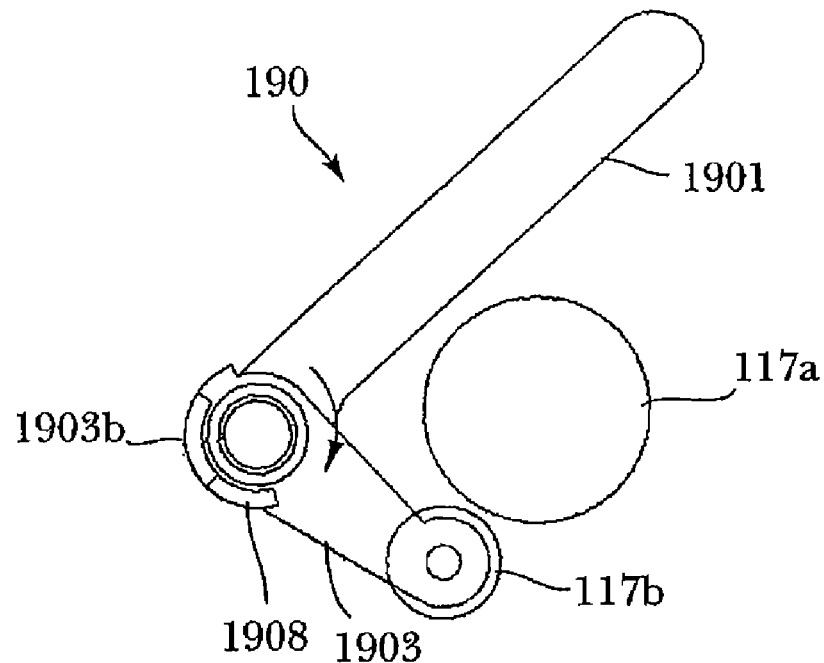
FIGS. 9A and 9B are second views for describing the operation of changing the nipping pressure of the nipping pressure changing mechanism.
Figure 9B:
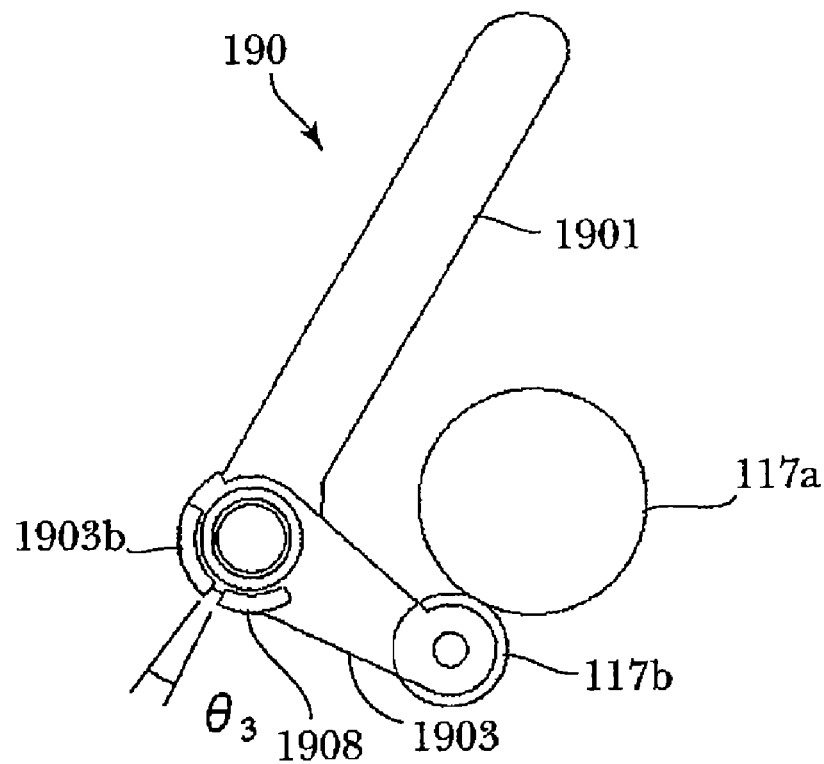

FIGS. 9A and 9B illustrate that the driven roller 117b is completely separated from the drive roller 117a in the light-press-contact/separating state. FIG. 9A illustrates that the cam 1905 is in the light-press-contact/separating state illustrated in FIG. 4B.

In this case, the phase of the stopper 1908 by which the stopper is fixed is made different from the phases illustrated in FIGS. 8B and 8C. By virtue of this structure, the stopper 1908 and the abutment portion 1903b of the arm 1903 abut against each other before the pressure lever 1901 falls down to the separating position. Thus, when the pressure lever 1901 is in the separating position, the driven roller 117b can completely be separated from the drive roller 117a. In this case too, the torsion spring 1904 generates torque to apply a force to the arm 1903 in the direction illustrated by an arrow in the figure.

FIG. 9B illustrates that the cam 1905 is in the pressure state illustrated in FIG. 4A. In this case, the cam 1905 pushes up the pressure lever 1901 after the driven roller 117b abuts the drive roller 117a, whereby the torsion spring 1904 generates torque by the amount of the displacement θ3 from the state illustrated in FIG. 9A.

As described above, the phase of the stopper 1908 is changed in the plural driven rollers 117b in the pair of first read rollers 117, whereby some of the plural driven rollers 117b can be separated from the corresponding drive rollers 117a. The remaining driven rollers 117b can be brought into the light-press-contact/separating state in which the press-contact force of the driven rollers 117b to the drive rollers 117a is reduced. Thus, the press-contact force (nipping force) of the pair of first read rollers 117 in the light-press-contact/separating state can be changed. The same is true for the pair of second read rollers 118.

The structure of the pair of first read rollers 117 and the pair of second read rollers 118 will be described with reference to FIG. 15B that is a schematic view in which the apparatus is viewed from the bottom.

The pairs of rotating bodies at both ends and the pair of the rotating bodies at the center (the pairs of rotating bodies indicated by a dotted line) among the plural pairs of first read rollers 117 that are arranged in the widthwise direction are completely separated by the mechanism illustrated in FIG. 9. On the other hand, the pairs of rotating bodies indicated by a solid line in FIG. 15B which constituting the pair of first read rollers 117 are in press contact in the light-press-contact/separating state by the mechanism illustrated in FIGS. 8B and 8C.

Figure 18A:
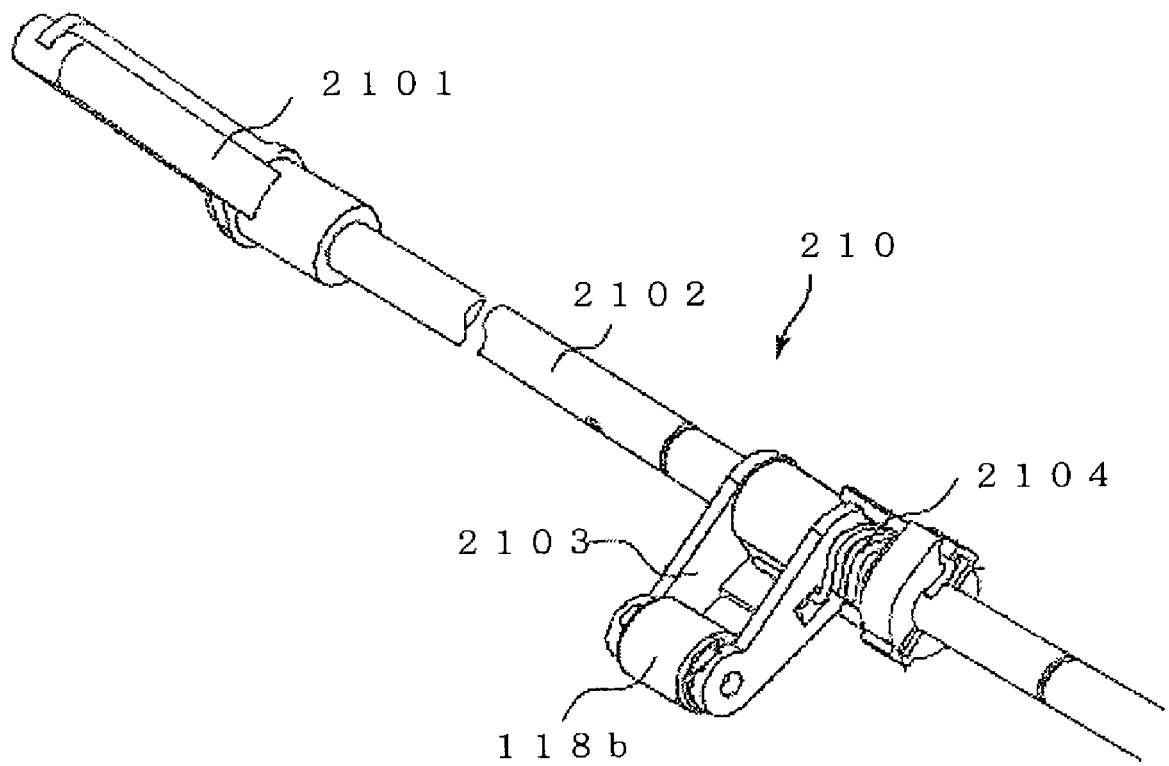
FIG. 18A is a perspective view illustrating a structure of a second press-contact force changing mechanism that changes the press-contact state of the pair of second read rollers.
Figure 18B:
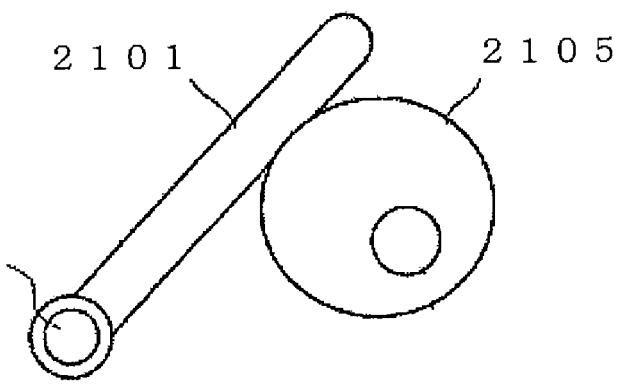
FIG. 18B is a sectional view illustrating a structure of a second press-contact force changing mechanism that changes the press-contact state of the pair of second read rollers.

The pair of first read rollers 117 has been described in detail. On the other hand, a second nipping pressure changing mechanism 210, having the structure same as that of the nipping pressure changing mechanism 190 that changes the nipping pressure of the pair of first read rollers 117, is provided for the pair of second read rollers 118 as described above as illustrated in FIGS. 18A and 18B. The detailed description is omitted, since the second nipping pressure changing mechanism 210 has the structure same as that of the nipping pressure changing mechanism 190. The second nipping pressure changing mechanism 210 has a second arm 2103 that serves as a holding member for holding the driven roller 118b of the pair of second read rollers 118 so as to be rotatable. The second arm 2103 is mounted to a rotation shaft 2102 so as to be rotatable. The rotation shaft 2102 and a spring 2104 of the arm 2103 impart nipping force to the pair of second read rollers 118. A second pressure lever at the end of the rotation shaft 2102 is in contact with a second cam 2105. The position of the rotation of the second cam 2105 that is driven by the separation motor is changed, whereby the state of the pair of second read rollers 118 is changed between the light-press-contact/separating state and the pressure state, like the pair of first read rollers 117.

Figure 15A:
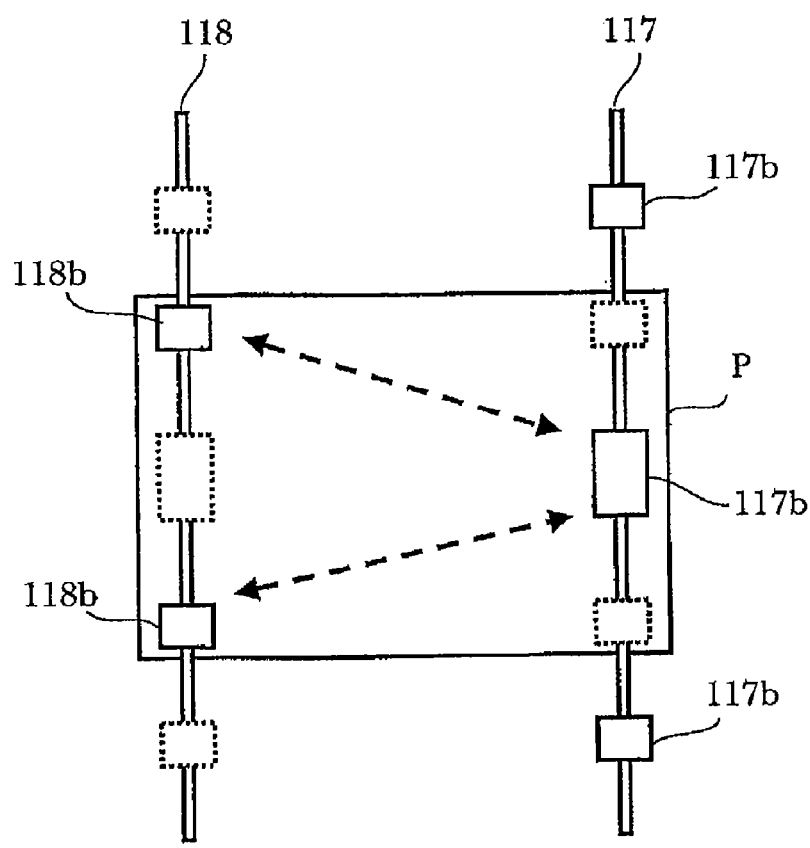
FIGS. 15A and 15B are views illustrating an arrangement of driven rollers, which are in press contact with the drive rollers, of the pairs of first and second read rollers.
Figure 15B:
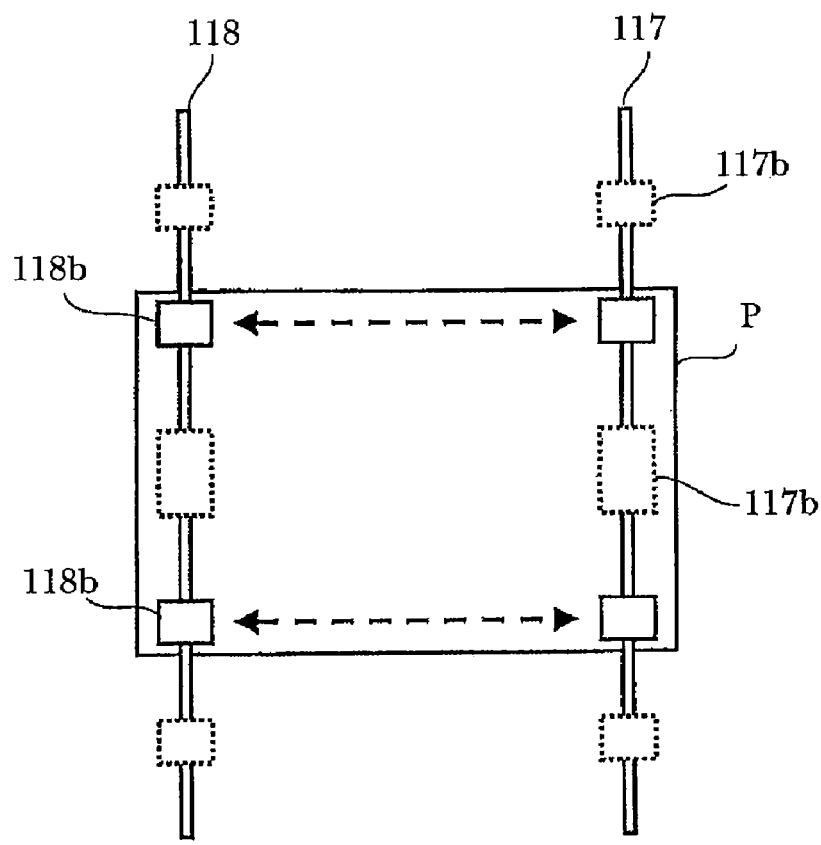
Figure 16:
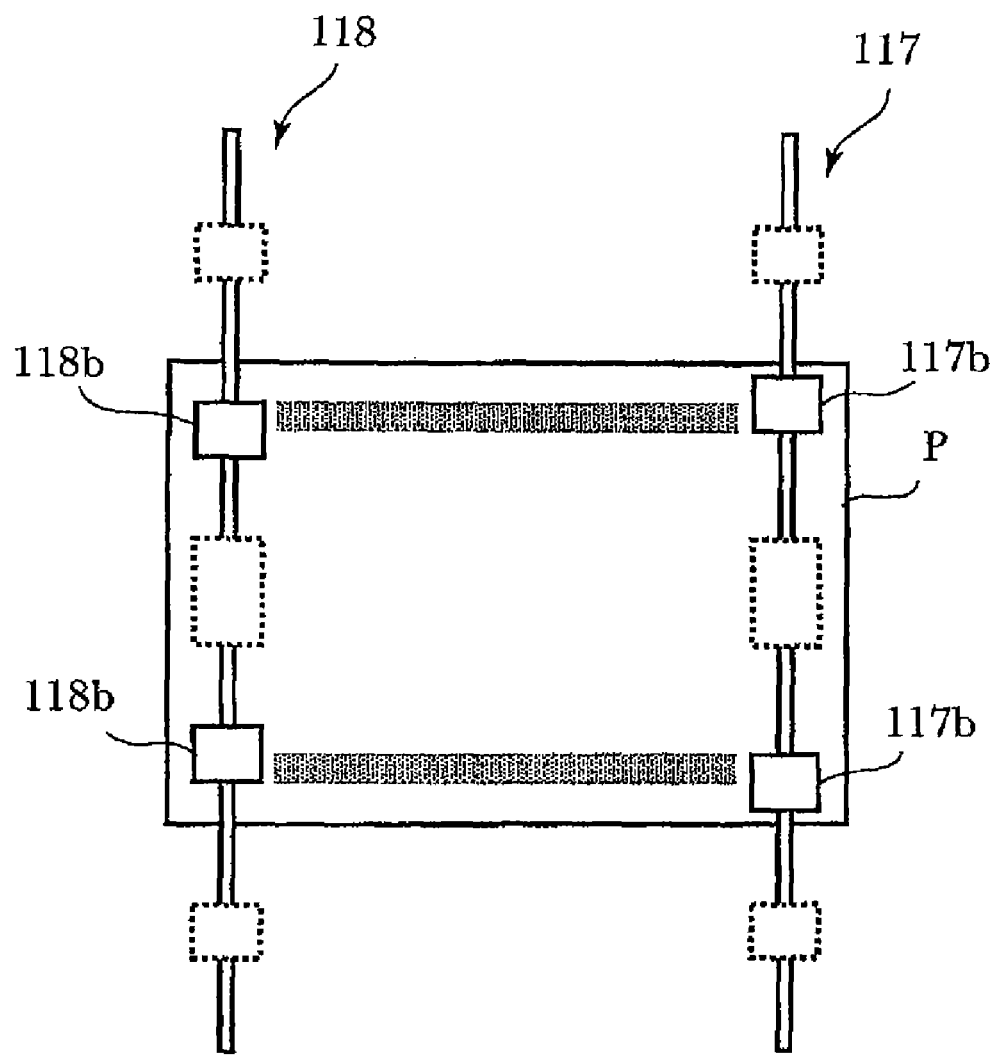
FIG. 16 is a view illustrating the arrangement of the drive rollers and the driven rollers of the pairs of first and second read rollers.

In FIG. 15B, the pairs of rotating bodies at both ends and the pair of the rotating bodies at the center (the pairs of rotating bodies indicated by a dotted line) of the pair of second read rollers 118 are completely separated by the mechanism described with reference to FIG. 9 in the light-press-contact/separating state. On the other hand, the pairs of rotating bodies constituting the pair of second read rollers 118 indicated by a solid line in FIG. 15B are in press contact in the light-press-contact/separating state by the mechanism illustrated in FIGS. 8B and 8C.

Conventionally, the press-contact force is reduced for all the pairs of rollers. In the conventional structure described above, the portion where the original and the pairs of rotating bodies are in contact with each other is great. Therefore, friction force is generated between the original and the pairs of rotating bodies at the contact portion. Accordingly, when all the pairs of rotating bodies are in press contact even if the press-contact force is weak, the nipping force for nipping the original is not eliminated, with the result that the original is liable to flutter when the trailing end of the original completely passes through the pairs of rollers.

Since some of the plural pairs of rotating bodies constituting the pair of first read rollers 117 are completely separated in the present embodiment as described above, the contact portion between the original and the rollers is reduced, compared to the conventional structure, so that the force for substantially nipping the original can be weakened. Therefore, the flutter of the original when the trailing end of the original completely passes through the pair of first read rollers 117 is more reduced than in the conventional structure. The same is true for the pair of second read rollers 118. Specifically, the flutter of the original when the leading end of the original enters the pair of second read rollers 118 is reduced.

Since the nipping pressure is changed by the rotation of the cam 1905, it takes time to change the nipping pressure. When the nipping pressure is instantaneously changed, the rapid variation in the conveying force affects the conveyance of the original, which leads to the deterioration in the reading quality. Accordingly, it is necessary to substantially continuously change the nipping pressure.

The case of the cam 1905 having the shape illustrated in FIG. 5 is considered, for example. When the separation motor 1906 is rotated at 400 pps with a reduction ratio in which the motor is rotated by 3° per 1 step, the time taken to change the nipping pressure is 75 msec, since the angle between R2 and R1 is 90°. When the rotating angle is 180°, the time taken to change the nipping pressure is 150 msec.

In this case, when the conveying speed is 610 mm/sec, the original advances to the downstream side at a minimum of 46 mm, up to 92 msec during the operation of changing the nipping pressure. When the conveying speed is 305 mm/sec, the original advances at a minimum of 23 mm, up to 46 mm during the operation of changing the nipping pressure.

As for a trigger for starting the rotation of the cam 1905, the changeover of the pair of first read rollers 117 from the pressure state to the light-press-contact/separating state is started with a predetermined conveying amount after the registration sensor S1 (FIG. 1) detects the trailing end of the original in the present embodiment. The changeover of the pair of second read rollers 118 from the light-press-contact/separating state to the pressure state is started when the original is conveyed in a predetermined distance after the read sensor S2 (FIG. 2) detects the leading end of the original.

In the present embodiment, the pair of second read rollers 118 is again in the light-press-contact/separating state after it is brought into the press-contact state, in order to avoid a shock caused upon the passage of the trailing end of the original. The pair of second read rollers 118 is changed from the pressure state to the light-press-contact/separating state when the registration sensor S1 detects the trailing end of the original, like the case of the pair of first read rollers 117.

Figure 10:
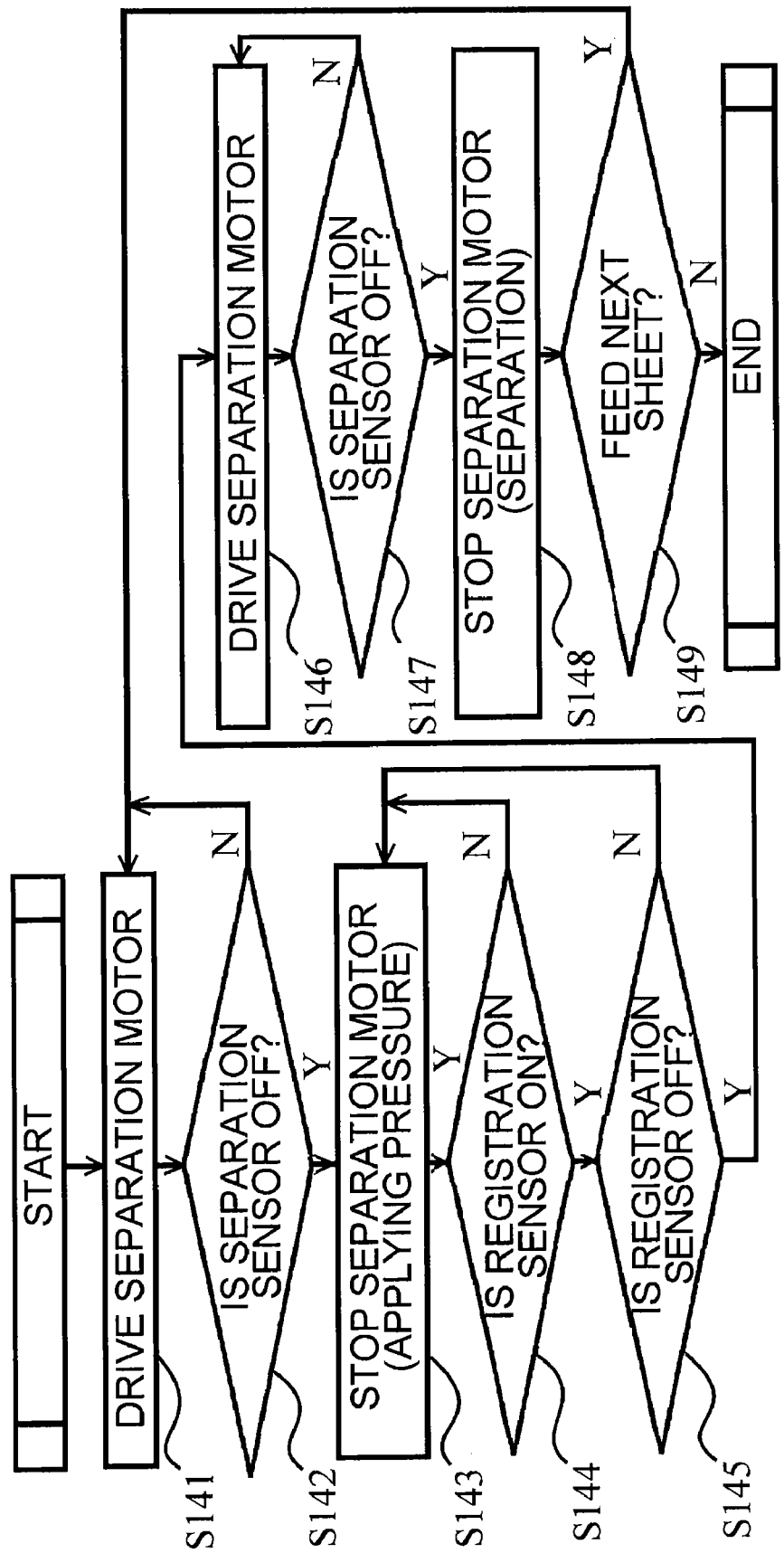
FIG. 10 is a flowchart for describing the nipping-pressure changing operation to the pair of first read rollers.

The operation of changing the nipping pressure of the pair of first read rollers by the control portion D of the ADF 100 according to the present embodiment will be described with reference to the flowchart illustrated in FIG. 10.

When an instruction of JOB start is given by a user, the control portion D drives the separation motor 1906 (S141) so as to rotate the cam 1905. In this case, the separation motor 1910 is in On state without detecting the sensor flag 1905c, which rotates integral with the cam 1905.

Next, the sensor flag 1905c rotates integral with the cam 1905, so that the separation sensor 1910 detects the sensor flag 1905c and the separation sensor 1910 is turned Off (Y at S142). After the separation sensor 1910 is turned Off as described above, the cam 1905 is rotated at a predetermined angle. When the cam 1905 moves to the pressure position, the separation motor 1906 is stopped (S143).

Next, the original is conveyed, and then, the registration sensor S1 detects the original, whereby the registration sensor S1 is turned On (Y at S144). It can be confirmed that the original is being conveyed by the On of the registration sensor S1. When the registration sensor S1 is turned Off after that (Y at S145), the passage of the trailing end of the original through the registration sensor S1 is detected, whereby the operation for displacing the cam 1905 to the separating position from the pressure position is started (S146).

Specifically, the cam 1905 is rotated after that. The separation sensor 1910 is temporarily turned On with the rotation of the cam 1905. When the separation sensor 1910 is again turned Off after that (Y in S147), the cam 1905 is rotated at a predetermined angle from this position, and when the cam 1905 is located at the separating position, the separation motor 1906 is stopped (S148).

When the control portion D determines that there is another sheet to be fed by an unillustrated sensor at the sheet feeding section after a series of the above-mentioned operation of moving the cam 1905 to the separating position from the pressure position (Y at S149), the program returns to S141 so as to drive the separation motor 1906 for the next sheet. When it is determined that there is no next sheet at S149 (N at S149), the JOB is ended. The control portion D controls the motor for the second read roller 118 that performs the separating and pressure operation on the basis of the output from the registration sensor S1 and the read sensor S2.

In the ADF 100 in recent years, the original tray 111 and the sheet discharge tray 121 are arranged at the same side as illustrated in FIG. 1 from the viewpoint of enhancing operability or from the viewpoint of the restriction in the outer dimension of the apparatus. Therefore, the conveying path is folded in the vicinity of the reading section. Further, it is necessary to ensure a space in which the first image reading portion 201, which is an optical unit, can make a scan in the reader 200 positioned below the ADF 100.

From the reason described above, the driven rollers 117b of the pair of first read rollers 117 and the driven rollers 118b of the pair of second read rollers 118 are arranged so as not to enter the region of the reader 200. Therefore, it is difficult to sufficiently reduce the space between the pair of first read rollers 117 and the pair of second read rollers 118. Accordingly, the space between the pair of first read rollers 117 and the pair of second read rollers 118 is about 80 mm in the present embodiment.

Figure 11A:
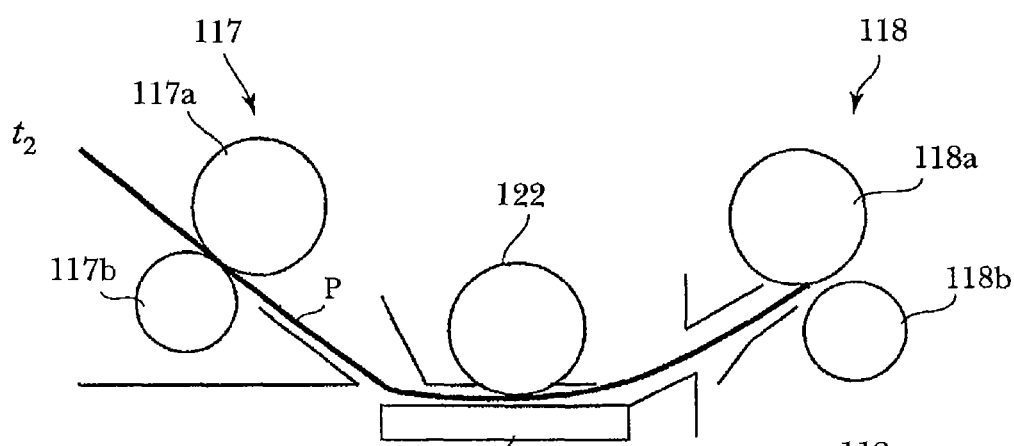
FIGS. 11A and 11B are views illustrating the movement of the original when the ADF reads the original.

FIG. 11 is a view illustrating the movement of the original when the original is read. When the original P is read, the original P conveyed by the pair of first read rollers 117 passes onto the second platen glass 102, and then, the leading end thereof reaches the pair of second read rollers 118 as illustrated in FIG. 11A. When the original is conveyed in a predetermined amount after the leading end reaches the pair of second read rollers 118, the nipping pressure of the pair of second read rollers 118 is increased.

Figure 11B:
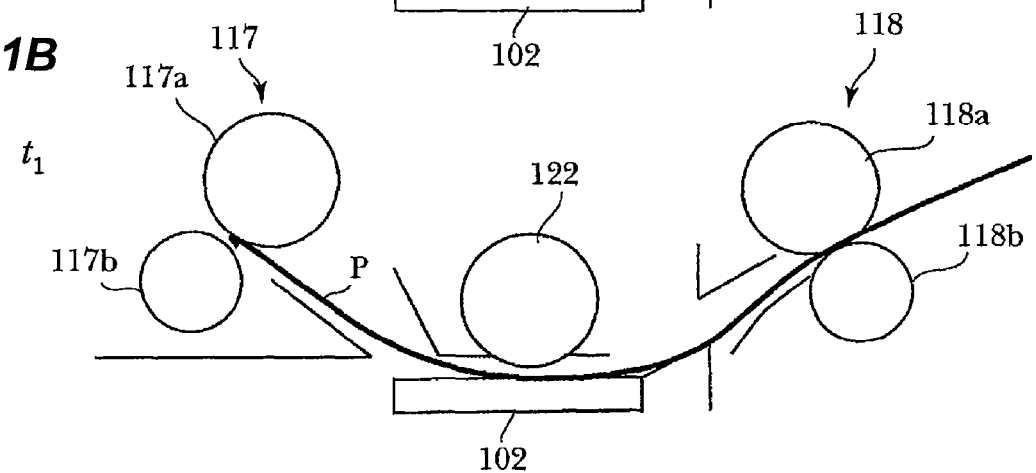

As illustrated in FIG. 11B, when the sheet is conveyed in a predetermined amount after the registration sensor S1 detects the trailing end of the original, the nipping pressure of the pair of first read rollers 117 is reduced. When the original is conveyed in a predetermined amount after the nipping pressure is reduced, the trailing end of the original passes through the pair of first read rollers 117.

Figure 12:
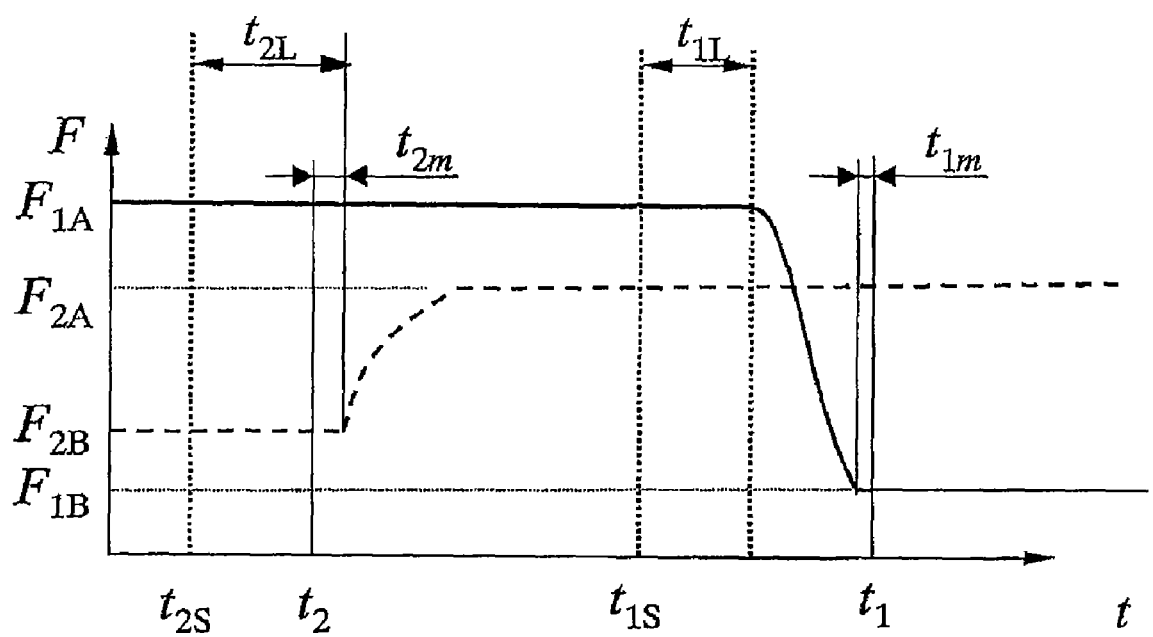
FIG. 12 is a view illustrating the time-series change of the conveying force of the pair of first read rollers and the pair of second read rollers during the conveyance of the original of an LTR size.

The timing of changing the nipping pressure described above is different depending upon the size of the original. When the original size is LTR (the length in the conveying direction is 216 mm) or A4 (the length in the conveying direction is 210 mm), or when the original has a size greater than the sizes described above, the time-series change of the nipping pressure of the pairs of first and second read rollers 117 and 118 becomes as illustrated in FIG. 12. In FIG. 12, F1A and F1B are the conveying forces of the pair of first read rollers 117, wherein F1A indicates the conveying force in the press-contact state and F1B indicates the conveying force in the light-press-contact/separating state. F2A and F2B are the conveying forces of the pair of second read rollers 118, wherein F2A indicates the conveying force in the press-contact state and F2B indicates the conveying force in the light-press-contact/separating state.

As illustrated in FIG. 12, the conveying force of the pair of first read rollers 117 is increased, but the conveying force of the pair of second read rollers 118 is reduced, at the timing t2S when the registration sensor S1 detects the original. Thereafter, as illustrated in FIG. 11A, the leading end of the original P reaches the pair of second read rollers 118, and the nipping pressure of the pair of second read rollers 118 is increased at the timing t2 when the original P is conveyed in a predetermined amount after that.

As illustrated in FIG. 11B, the nipping pressure of the pair of first read rollers 117 is reduced when the original is conveyed in a predetermined amount after the timing t1S when the registration sensor S1 detects the trailing end of the original. The trailing end of the original passes through the pair of first read rollers 117 at the timing t1 when the original is conveyed in a predetermined amount after the nipping pressure is reduced.

In the present embodiment, as illustrated in FIG. 11A, the nipping pressure of the pair of second read rollers 118 starts to rise when the original is conveyed in a predetermined amount from the timing t2 when the leading end of the original P reaches the pair of second read rollers 118, i.e., an allowance time t2$m$ has been elapsed.

The trigger for changing the nipping pressure of the pair of second read rollers 118 is the detection of the leading end of the original by the registration sensor S1 (or the read sensor S2). This time is defined as t2S. In FIG. 12, t2L is a time lag that is the period from when the registration sensor S1 detects the leading end of the original to the time when the nipping pressure is started to be changed in actuality.

Supposing that the time when the registration sensor S1 detects the trailing end of the original is defined as t1S. At t1S, the registration sensor S1 detects the trailing end of the original, and after the original is further conveyed in a predetermined conveying amount, the conveying force of the pair of first read rollers 117 is decreased. In FIG. 12, t1L is a time lag that is the period during the above-mentioned operation, t1 is the time when the original is conveyed in a predetermined amount after the nipping pressure is reduced, and t1$m$ is an allowance time during this period.

As described above, in the present embodiment, the conveying force of the pair of first read rollers 117 and the conveying force of the pair of second read rollers 118 are varied so as to change the magnitude relation between both of the conveying forces, whereby the rollers that mainly convey the original is changed over substantially continuously. By virtue of this structure, the instantaneous variation in the conveying state, which is caused when the trailing end of the original completely passes through the pair of first read rollers 117, can be reduced.

When the interval between t2 and t1 is sufficient in case where the size of the original P is LTR or A4 or the original is a long-sized sheet having the size greater than the above-mentioned size, the time (distance) for changing the nipping pressure can be ensured as described above. However, when the size of the original P is small such as A5, STMT, or B6, the interval between t2 and t1 is insufficient as illustrated in FIG. 13.

Figure 13A:
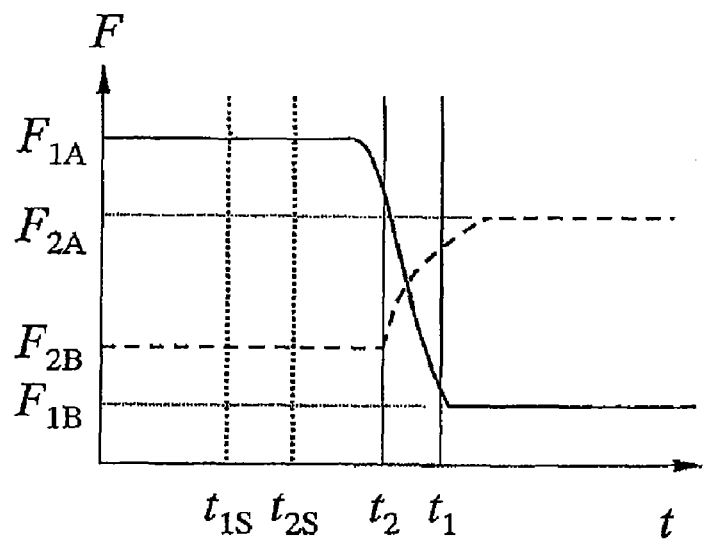
FIGS. 13A and 13B are first views illustrating the time-series change of the conveying force of the pair of first read rollers and the pair of second read rollers during the conveyance of the small-sized original.

As a countermeasure of this situation, the changeover from the light-press-contact/separating state to the pressure state of the pair of second read rollers 118 may be performed immediately after the timing t2 when the leading end of the original reaches the pair of second read rollers 118 as illustrated in FIG. 13A, for example. Specifically, the changeover for increasing the conveying force from F2B to F2A may be started immediately after the timing t2 when the leading end of the original reaches the pair of second read rollers 118.

Immediately before the timing t1 when the trailing end of the original passes through the pair of first read rollers 117, the changeover from the pressure state to the light-press-contact/separating state of the pair of first read rollers 117 may be completed, i.e., the reduction of the conveying force from F1A to F1B may be completed. At the timing t2 when the leading end of the original reaches the pair of second read rollers 118, the conveying force of the pair of first read rollers 117 is being changed.

In the present embodiment, the magnitude relation of the conveying forces of the pairs of first and second read rollers 117 and 118 at this moment can be set as described below by designing the shape of the cam.

(conveying force F1A' of the pair of first read rollers
117 that is now being changed)>(conveying force
F2B of the pair of second read rollers 118)

By virtue of the relationship, the nipping pressure may be applied to the pair of second read rollers 118 with the pair of first read rollers 117 keeping the main conveying force.

Immediately after this, the conveying force of the pair of second read rollers 118 may be increased from F2B to F2A, and the change of the conveying force of the pair of first read rollers 117 may be completed at the moment when the trailing end of the original passes through the pair of first read rollers 117.

Thus, the magnitude relation of the conveying forces of the pairs of first and second read rollers 117 and 118 at this moment becomes as described below. Consequently, the main conveying force can be transferred to the pair of second read rollers 118 before the trailing end of the original passes through the pair of first read rollers 117.

(conveying force F2A' of the pair of second read rollers 118 that is now being changed)>(conveying force F1B of the pair of first read rollers 117)

However, there is an error in the estimation of the conveying amount after the registration sensor S1 detects the trailing end of the original or after the read sensor S2 detects the leading end of the original in actuality. Therefore, the conveying force is necessarily changed with a predetermined allowance time. Accordingly, in the present embodiment, the allowance times t1$m$ and t2$m$ are set. The allowance times t1$m$ and t2$m$ are set depending upon the shape of the conveying path or the conveying speed.

Figure 13B:
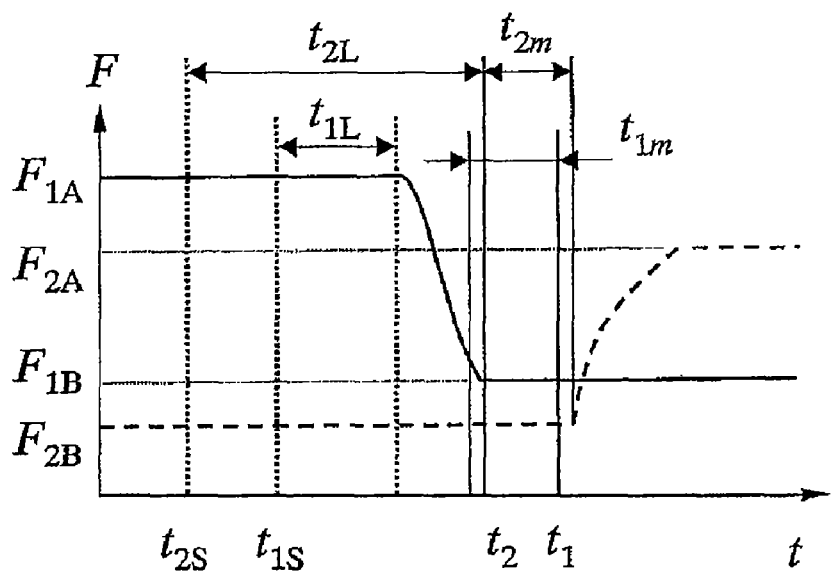

Depending upon the allowance times t1$m$ and t2$m$, both of the pairs of first and second read rollers 117 and 118 are in the light-press-contact/separating state during the period from t2 when the leading end of the original reaches the pair of second read rollers 118 to t1 when the trailing end thereof passes through the pair of first read rollers 117 as illustrated in FIG. 13B. Specifically, the conveying forces of the pairs of first and second read rollers 117 and 118 become F1B and F2B respectively. When the pairs of first and second read rollers 117 and 118 are in the light-press-contact/separating state, a slippage occurs between the drive rollers and the original when the thick original is conveyed in particular, which might create a danger of the original being unable to be conveyed.

Figure 14:
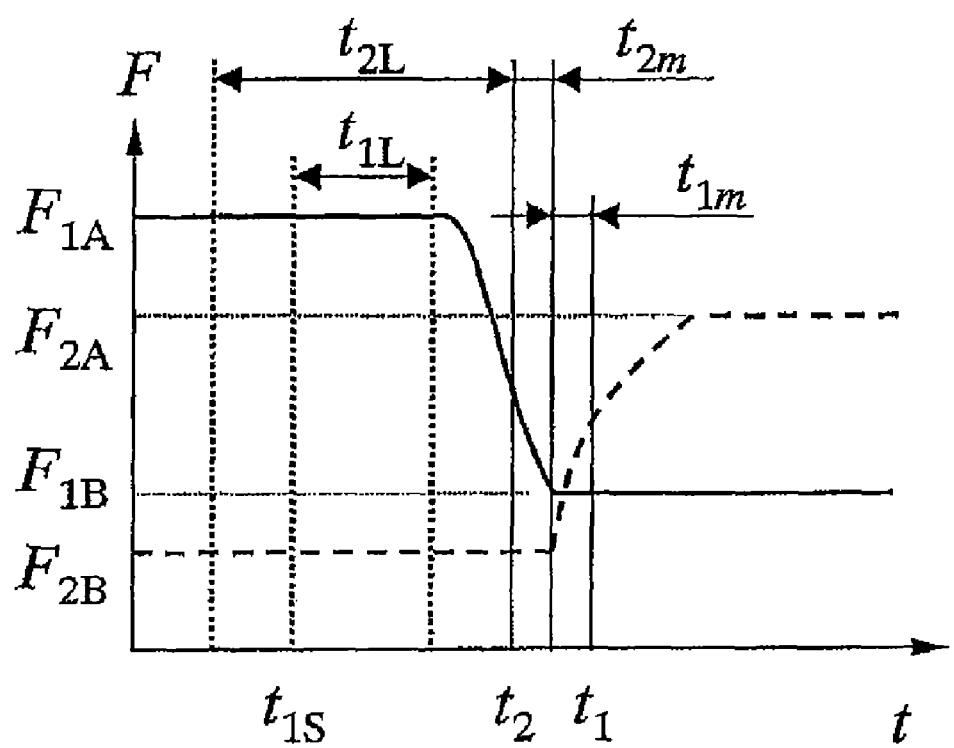
FIG. 14 is a second view illustrating the time-series change of the conveying force of the pair of first read rollers and the pair of second read rollers during the conveyance of the small-sized original.

In order to avoid that the pairs of read rollers 117 and 118 are in the light-press-contact/separating state, the allowance times t1$m$ and t2$m$ are set as illustrated in FIG. 14. Specifically, they are set in such a manner that the timing when the pair of first read rollers 117 is changed from the transition state to the light-press-contact/separating state (the completion of the changeover to the light-press-contact/separating state) and the timing when the pair of second read rollers 118 is changed from the light-press-contact/separating state to the transition state (the start of the change to the press-contact state) are overlapped. In order to achieve this, the relationship between the allowance times t1$m$ and t2$m$ in FIG. 14 should be set as described later.

$$t1m+t2m<t1-t2$$

In the present embodiment, the space between the pairs of first and second read rollers 117 and 118 is 80 mm as described above. Therefore, if the minimum size of the original that can be conveyed is defined as STMT having 139 mm, the conveyance allowance has to be set to (139−80)/2=30 mm, since t1$m$=t2$m$ is ideal. When the conveying speed is 610 mm/sec, the allowance times are set to be t1$m$=t2$m$=49 msec. When the conveying speed is 305 mm/sec, the allowance times are set to be t1$m$=t2$m$=98 msec.

The allowance times t1$m$ and t2$m$ can be obtained by setting time lags t1L and t2L that are the periods from the detection by the sensor, which becomes the trigger, to the time when the nipping pressure is actually changed, considering a time loss from the instruction for starting the rotation of the separation motor to the time when the separation motor is actually driven. When the equation of t1$m$+t2$m$≈t2−t1 is satisfied, the original is conveyed with both of the pairs of first and second read rollers 117 and 118 being substantially in the separating state.

As described above, in the present embodiment, the start of changing the pair of second read rollers 118 to the press-contact state is executed before the completion of the change of the sheet conveying force of the pair of first read rollers 117 to the light-press-contact/separating state, regardless of the size of the original. Accordingly, even when a small-sized thick original is conveyed, the original can stably be conveyed with a sufficient conveying force, and further, the instantaneous rapid change in the conveying state, which is caused when the trailing end of the original completely passes through the pair of first read rollers 117, can be reduced. Even when a small-sized thin original is conveyed, the original can stably be conveyed, and further, the deterioration of the reading quality can be prevented, whereby the damage to the original can be reduced.

Specifically, the start of the change of the sheet conveying force of the pair of second read rollers 118 is executed before the completion of the change of the sheet conveying force of the pair of first read rollers 117, regardless of the size of the original, whereby the sheet can stably be conveyed, and further, the deterioration in the reading quality can be reduced.

FIG. 15 illustrates the arrangement of the driven rollers that are in press contact with the corresponding drive rollers in the light-press-contact/separating state in the pairs of first and second read rollers 117 and 118. In FIG. 15, the rollers indicated by a solid line represents the driven rollers that are in press contact with the drive rollers, and the rollers indicated by a dotted line represents the driven rollers that are separated from the drive rollers. When the driven rollers 117$b$ and 118$b$ that are in press contact with the drive rollers are arranged as illustrated in FIG. 15A, the distribution of the pressure applied to the original becomes non-uniform, so that wrinkles might be generated in the direction illustrated by an arrow in the figure.

Therefore, in the present embodiment, the driven rollers 117$b$ and 118$b$ located at the same position in the widthwise direction are allowed to be in press contact with the drive rollers. By virtue of this arrangement, the distribution of the pressure applied to the original P becomes parallel to the original conveying direction, whereby the original P is stabilized.

The arrangement of the drive rollers and the driven rollers of the pair of first read rollers 117 and the arrangement of the drive rollers and the driven rollers of the pair of second read rollers 118 are desirably matched on the original conveying direction (widthwise direction). However, the same effect can be achieved with the arrangement in which the nip portion (nip area) of the drive rollers and the driven rollers 117$b$ and 118$b$ of the pair of first read rollers 117 and the pair of second read rollers 118 are overlapped with each other in the original conveying direction, i.e., in which there is an overlapped nip portion between the pair of first read rollers 117 and the pair of second read rollers 118 in the widthwise direction of the original crossing the original conveying direction.

Figure 17:
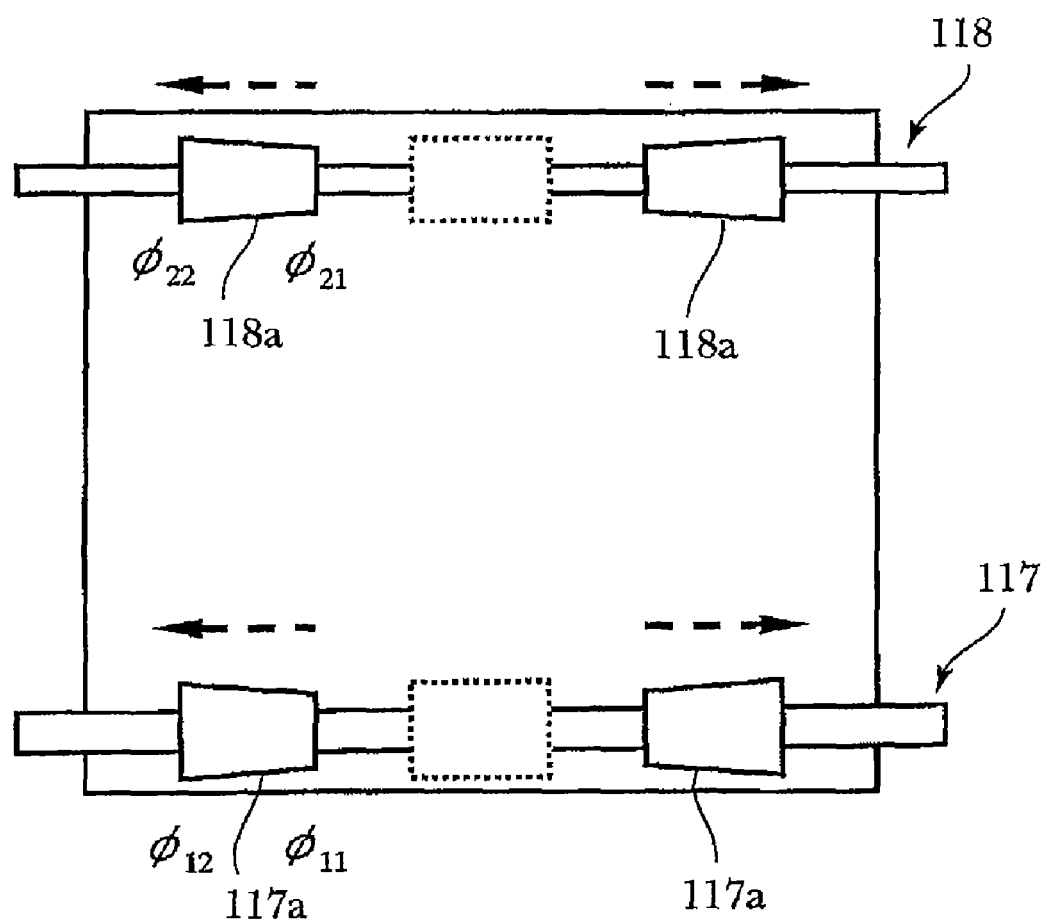
FIG. 17 is a view illustrating the shape of each of the drive rollers of the pairs of first and second read rollers.

Each of the drive rollers 117$a$ and 118$a$ at the press-contact portion is formed into the shape as illustrated in FIG. 17. Specifically, the diameter φ22 and φ12 at the portion at the outside in the main scanning direction are set to be greater than the diameter φ21 and φ11 at the central portion. With this structure, the original P is pulled in both directions on the main scanning direction. By virtue of this structure, the generation of wrinkles can be more prevented, whereby the reading quality can be enhanced.

The description above is for the image reader (reader). However, the present invention is not limited thereto. For example, the present invention can be applied to an image forming apparatus provided with an image reader and an image forming portion that forms an image on the basis of image information read by the image reader.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-058498, filed Mar. 7, 2008, which is hereby incorporated by reference herein in its entirety.

What is claimed is:

1. An image reader comprising:
an image reading portion that reads an image of a sheet conveyed at an image reading position;
a first conveying portion that includes plural pairs of first rotating bodies arranged in the widthwise direction of the sheet, which crosses the sheet conveying direction, and that is provided at the upstream of the image reading position in the sheet conveying direction;
a second conveying portion that includes plural pairs of second rotating bodies arranged in the widthwise direction of the sheet and that is provided at the downstream of the image reading position in the sheet conveying direction;
a first changing portion that makes a changeover between a first state in which the plural pairs of first rotating bodies nip the sheet and a second state in which at least one of the plural pairs of first rotating bodies is separated and the nipping force of the other pairs of first rotating bodies is reduced compared to the first state; and a second changing portion that makes a changeover between a first state in which the plural pairs of second rotating bodies nip the sheet and a second state in which at least one of the plural pairs of second rotating bodies is separated and the nipping force of the other pairs of second rotating bodies is reduced compared to the first state, wherein the state of the plural pairs of first rotating bodies is changed from the first state to the second state during the conveyance of the sheet by the pairs of first rotating bodies and before the trailing end of the sheet passes through the pairs of first rotating bodies, and the state of the plural pairs of second rotating bodies is changed from the second state to the first state during the conveyance of the sheet by the pairs of second rotating bodies after the leading end of the sheet reaches the pairs of second rotating bodies.

2. An image reader according to claim 1, wherein a nip area of the pairs of rotating bodies, which nip the sheet in the second state, of the plural pairs of first rotating bodies and a nip area of the pairs of rotating bodies, which nip the sheet in the second state, of the plural pairs of second rotating bodies are overlapped with each other in a view of the sheet conveying direction.

3. An image reader according to claim 1, wherein the timing when the plural pairs of second rotating bodies, which are in the second state, start to change their state to the first state is earlier than the timing when the plural pairs of first rotating bodies, which are in the first state, changes their state to the second state, regardless of the size of the sheet.

4. An image reader according to claim 1, wherein the first changing portion includes:

a holding member that holds of the plural pairs of first rotating bodies so as to be rotatable;

a shaft that rotatably holds the holding member so as to change the state of the plural pairs of first rotating bodies;

a stopper that is mounted to the shaft for elastically restricting the rotation angle of the holding member; and a cam mechanism that allows the shaft to rotate so as to rotate the holding member integral with the shaft in order to continuously change the nipping force of the pairs of rotating bodies, wherein the mounting position of the stopper to the shaft for restricting the rotation angle of the holding member that holds one of the rotating bodies of the pairs of rotating bodies, which are separated in the second state, of the plural pairs of first rotating bodies, and the mounting position of the stopper to the shaft for restricting the rotation angle of the holding member that holds one of the rotating bodies of the pairs of rotating bodies, which nip the sheet in the second state, of the plural pairs of first rotating bodies are different.

5. An image reader according to claim 1, wherein the second changing portion includes:

a holding member that holds the plural pairs of second rotating bodies so as to be rotatable;

a shaft that rotatably holds the holding member so as to change the state of the plural pairs of second rotating bodies;

a stopper that is mounted to the shaft for elastically restricting the angle of the rotation of the holding member; and a cam mechanism that allows the shaft to rotate so as to rotate the holding member integral with the shaft in order to continuously change the nipping force of the pairs of rotating bodies, wherein the mounting position of the stopper to the shaft for the pair of rotating bodies of the plural pairs of second rotating bodies, which is separated in the second state, and the mounting position of the stopper to the shaft for the pair of rotating bodies of the plural pairs of second rotating bodies, which nip the sheet in the second state, are different.

6. An image forming apparatus comprising:

an image reader according to claim 1 that reads an image of a sheet; and an image forming portion that forms an image on the basis of the image information read by the image reader.

7. An image reader comprising:

an image reading portion that reads an image of a sheet conveyed at an image reading position;

a first conveying portion that includes plural pairs of first rotating bodies arranged in the widthwise direction of the sheet, which crosses the sheet conveying direction, that is provided at the upstream of the image reading position in the sheet conveying direction; and a second conveying portion that includes plural pairs of second rotating bodies arranged in the widthwise direction of the sheet, which crosses the sheet conveying direction, that is provided at the downstream of the image reading position in the sheet conveying direction, wherein both the plural pairs of first rotating bodies and the plural pairs of second rotating bodies can be changed in a first state in which the plural pairs of rotating bodies nip the sheet and a second state in which at least one of the plural pairs of rotating bodies is separated and the other pairs of rotating bodies nip the sheet, wherein the state of the plural pairs of first rotating bodies is changed from the first state to the second state during the conveyance of the sheet by the pairs of first rotating bodies and before the trailing end of the sheet passes through the pairs of first rotating bodies, wherein the state of the plural pairs of second rotating bodies is changed from the second state to the first state during the conveyance of the sheet by the pairs of second rotating bodies after the leading end of the sheet reaches the pairs of second rotating bodies, and wherein a position of the one of the plural pairs of first rotating bodies which nips the sheet in the second state corresponds to a position of the one of the plural pairs of second rotating bodies which nip the sheet in the second state in the width direction.

8. An image reader according to claim 7, further comprising:

a first changing portion that makes a changeover between the first state and the second state in which at least one of the plural pairs of first rotating bodies is separated and the nipping force of the other pairs of first rotating bodies is reduced compared to the first state; and a second changing portion that makes a changeover between the first state and the second state in which at least one of the plural pairs of second rotating bodies is separated and the nipping force of the other pairs of second rotating bodies is reduced compared to the first state.

* * * * *